US012566582B2

(12) United States Patent
Li et al.

(10) Patent No.: US 12,566,582 B2
(45) Date of Patent: Mar. 3, 2026

(54) DISPLAY METHOD AND ELECTRONIC DEVICE

(71) Applicant: HUAWEI TECHNOLOGIES CO., LTD., Shenzhen (CN)

(72) Inventors: Senhao Li, Wuhan (CN); Yu Huang, Shenzhen (CN); Shiyao Hu, Wuhan (CN); Huaxiang Zhang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 218 days.

(21) Appl. No.: 18/682,406

(22) PCT Filed: Aug. 1, 2022

(86) PCT No.: PCT/CN2022/109474
§ 371 (c)(1),
(2) Date: Feb. 8, 2024

(87) PCT Pub. No.: WO2023/016291
PCT Pub. Date: Feb. 16, 2023

(65) Prior Publication Data
US 2024/0345792 A1      Oct. 17, 2024

(30) Foreign Application Priority Data
Aug. 9, 2021      (CN) .......................... 202110909594.8

(51) Int. Cl.
*G06F 3/14* (2006.01)
*G06F 3/04845* (2022.01)
(52) U.S. Cl.
CPC ........ *G06F 3/1446* (2013.01); *G06F 3/04845* (2013.01)

(58) Field of Classification Search
None
See application file for complete search history.

(56) References Cited

U.S. PATENT DOCUMENTS

| | | | | |
|---|---|---|---|---|
| 2018/0088888 A1* | 3/2018 | Ma | .......................... | G06F 3/147 |
| 2021/0397398 A1* | 12/2021 | Han | .......................... | G09G 3/32 |
| 2022/0317962 A1* | 10/2022 | Duan | .................... | G06F 3/0484 |

FOREIGN PATENT DOCUMENTS

| | | |
|---|---|---|
| CN | 105045552 A | 11/2015 |
| CN | 105100658 A | 11/2015 |

(Continued)

*Primary Examiner* — Krishna P Neupane
(74) *Attorney, Agent, or Firm* — Leydig, Voit & Mayer, Ltd.

(57) ABSTRACT

A display method and an electronic device that relate to the field of terminal technologies are provided. A first electronic device can obtain identification information of a plurality of second electronic devices and establish a correspondence between a display region of the first electronic device and identification information of each second electronic device. Therefore, the second electronic devices can automatically display content in different display regions based on the correspondence. The method includes performing, by the first electronic device, sending a display configuration message, receiving identification information sent by a second electronic device, establishing a correspondence between a display region and the identification information, and sending the correspondence and displayed display content. In this way, the second electronic device can determine, based on the correspondence, a part or all of display content that is in the received display content and that corresponds to the display region.

20 Claims, 23 Drawing Sheets

(56)　　　　　　　References Cited

FOREIGN PATENT DOCUMENTS

| CN | 105468326 | A | 4/2016 |
| CN | 108848324 | A | 11/2018 |
| CN | 112286474 | A | 1/2021 |
| CN | 112292723 | A | 1/2021 |

* cited by examiner (a)

(b)

| Packet header | Data |
|---|---|
| Display region matching message prefix | Device identifier display indication message |

601 602

S2401: A first electronic device displays a first user interface, where the first user interface includes first display content, a first closed box, and a second closed box

↓

S2402: The first electronic device displays a second user interface, where the second user interface includes the first display content, the first closed box, the second closed box, a first control, and a second control

↓

S2403: The first electronic device receives a first operation performed by a user on the first control and the second control, and displays the first control and/or the second control in the first closed box and/or the second closed box

FIG. 24

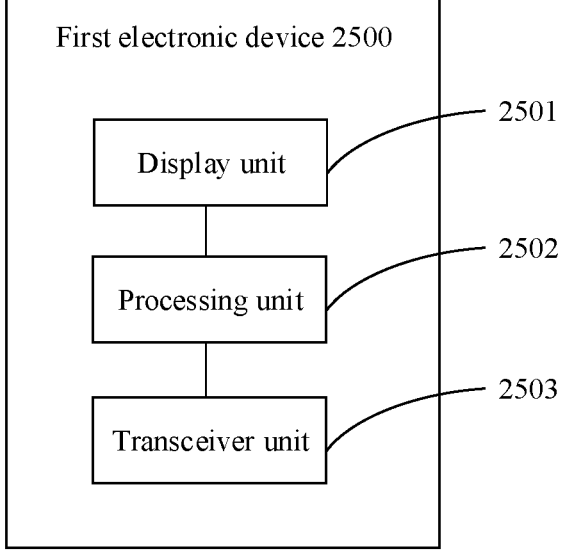

FIG. 25

DISPLAY METHOD AND ELECTRONIC DEVICE

CROSS-REFERENCE TO RELATED APPLICATIONS

This application is a national stage of International Application No. PCT/CN2022/109474, filed on Aug. 1, 2022, which claims priority to Chinese Patent Application No. 202110909594.8, filed on Aug. 9, 2021. Both of the aforementioned applications are hereby incorporated by reference in their entireties.

TECHNICAL FIELD

The present application relates to the field of terminal technologies, and in particular, to a display method and an electronic device.

BACKGROUND

A multi-screen combination technology is a technology in which a plurality of displays are combined to form a large-sized display. The multi-screen combination technology can meet a requirement of a user for large-screen (or giant-screen) display, and can reduce maintenance costs of a large screen.

However, before a splicing screen formed by combining a plurality of displays is used, pieces of display content of the displays needs to be set one by one based on a location relationship between the displays in the splicing screen by using a control apparatus (for example, a remote control), so that a complete and ordered image can be displayed on the splicing screen. If a large quantity of displays need to be disposed, the user needs to perform a plurality of operations to complete setting of the splicing screen. As a result, the setting process is cumbersome, and a user operation is difficult. In addition, in a distributed display scenario, the user also needs to use the control apparatus to set the pieces of display content of the displays one by one, so as to implement correct distributed display. The setting process is cumbersome, and user experience is affected.

SUMMARY

To resolve the foregoing technical problem, embodiments of this application provide a display method and an electronic device. According to the technical solutions provided in embodiments of this application, a first electronic device can obtain identification information of a plurality of second electronic devices, and establish a correspondence between a display region of the first electronic device and the identification information of the second electronic devices. Therefore, the second electronic device automatically displays display content in different display regions based on the correspondence. The correspondence is established, so that display setting of the second electronic device is quickly completed on a side of the first electronic device, to reduce user operation difficulty and improve user experience.

Embodiments of this application provide the following technical solutions.

According to a first aspect, a display method is provided, and is applied to a first electronic device. The method includes: displaying first display content; sending a first message, where the first message indicates to perform display configuration; obtaining identification information of a second electronic device, where there are a plurality of second electronic devices, and each second electronic device corresponds to one piece of identification information; determining a first correspondence between a display region of the first electronic device and identification information, where there are a plurality of display regions, and display content corresponding to each display region of the first electronic device is a part or all of the first display content; sending a second message; and sending the first display content. The second message is used by the second electronic device to obtain a display region corresponding to the identification information from the second message based on the identification information, and the display region is used by the second electronic device to display display content that is in the first display content and that corresponds to the display region.

In some embodiments, a distributed display system includes one first electronic device and a plurality of second electronic devices, where each second electronic device can display a part or all of display content of the first electronic device. The first electronic device can select, based on a requirement, display content to be displayed on the second electronic device, and send a corresponding display region to the second electronic device, and the second electronic device can display display content corresponding to the display region.

In some embodiments, the first electronic device sends the first display content to the second electronic device, where the first display content is display content displayed on the first electronic device. That is, the first electronic device does not need to process image data, for example, segment the image data, and send segmented image data to a corresponding second electronic device for display. Instead, the complete image data is sent to all the second electronic devices, so that power consumption generated when the first electronic device processes the image data can be effectively reduced, and a data transmission process can be simplified. Further, the first electronic device does not need to establish a one-to-one data transmission channel to each second electronic device. This helps reduce signaling overheads.

In this way, according to the display method provided in this embodiment of this application, a correspondence between a display region of a main control end device (namely, the first electronic device) and identification information of a controlled end device (namely, the second electronic device) can be established, so that display content of the corresponding display region of the main control end device can be displayed by using different controlled end devices. This reduces operation difficulty of configuring the controlled end device by a user and effectively improves user experience.

According to the first aspect, the first message and/or the second message are/is sent in a broadcast manner or a multicast manner.

In this way, the first electronic device does not need to establish the one-to-one data transmission channel to each second electronic device, but sends the correspondence and the complete image data in the multicast or broadcast manner, and does not need to separately send the correspondence and the image data to the second electronic device a plurality of times. This can effectively reduce signaling overheads.

According to any one of the first aspect or the foregoing implementations of the first aspect, before the sending a second message, the method further includes: determining the second message based on the first correspondence, where in the second message, each piece of identification information and a display region that has the first correspondence with the identification information are corresponding field content.

In some embodiments, the first electronic device sends, in the broadcast or multicast manner, a packet that carries a correspondence, and all the second electronic devices can receive the packet. After receiving the packet, the second electronic device parses packet data, identifies an identification digit of a field that includes identification information, and performs matching on the identification information if determining that the field carries the identification information. If the read identification information is the same as the identification information of the second electronic device, it is determined that display region information corresponding to the identification information is required display region information. Specifically, the packet may include the identification information and a display region. After obtaining the identification information through matching, the second electronic device obtains the display region from the corresponding field, and determines to-be-displayed image data based on the display region (for example, including pixel coordinates), to implement display.

In some embodiments, that the identification information and the display region are corresponding field content includes that the identification information and the display region are adjacent field content, or a sequential location of the identification information in all identification information and a sequential location of the corresponding display region in all display regions are corresponding sequential location field content.

In this way, after obtaining the second message, the second electronic device may obtain the display region from a corresponding field based on the identification information that matches the identification information of the second electronic device, so as to quickly complete display configuration.

According to any one of the first aspect or the foregoing implementations of the first aspect, the display region includes pixel coordinates of the display content that is in the first display content and that corresponds to the display region.

In some embodiments, the display content received by the second electronic device is the complete first display content displayed on the first electronic device. Therefore, the second electronic device needs to determine, based on the display region, specific display content that should be displayed on the second electronic device. For example, the second electronic device can determine, based on the pixel coordinates of the display content corresponding to the display region, display content that is to be displayed on the second electronic device and that is in the first display content, and quickly complete display setting.

According to any one of the first aspect or the foregoing implementations of the first aspect, the first message and/or the second message include/includes a first identification digit, and the first identification digit indicates that a message type is a display configuration message.

In some embodiments, the first message and the second message are sent in the multicast or broadcast manner. Therefore, the first identification digit is preconfigured in the first message and/or the second message. In this case, in a process of listening to the multicast message or the broadcast message, the second electronic device can determine, based on the first identification digit, that the current broadcast message or the current multicast message is a message used for display configuration, so as to implement message receiving. Further, an electronic device that does not need to perform message configuration may also choose not to receive the message including the first identification digit, so that the correct display configuration message can be received based on the first identification digit without further parsing the message.

In some embodiments, in a process in which the first electronic device performs display configuration on the second electronic device, the first identification digit may be preconfigured in the message sent in the broadcast or multicast manner.

According to any one of the first aspect or the foregoing implementations of the first aspect, the obtaining identification information of a second electronic device includes: collecting, by using an image collecting apparatus in the first electronic device, the identification information displayed on a display of the second electronic device, where the identification information is presented in one or more manners of a two-dimensional code, an image, and/or a character; or receiving a third message sent by the second electronic device in response to the first message, where the third message carries the identification information.

In some embodiments, the third message may also have a first identification digit that is the same as that of the first message and the second message, and indicates that a message type of the third message is a display configuration message.

In some embodiments, the first electronic device collects the identification information displayed on the second electronic device, and in a process of collecting the identification information, may further obtain spatial location information of each second electronic device. For example, the second electronic device is a display device in a splicing screen display system, and in the process of collecting the identification information, the first electronic device can determine a spatial location relationship of a corresponding display device in the splicing screen display system.

In some embodiments, the identification information is unique identification information of the second electronic device, and indicates the second electronic device. For example, the identification information is a BLE address, an IP address, or the like of the second electronic device. The first electronic device may distinguish between the second electronic devices based on the identification information. Therefore, the first electronic device may determine the display region corresponding to the second electronic device by establishing the correspondence between the display region and the identification information.

According to any one of the first aspect or the foregoing implementations of the first aspect, before the determining a first correspondence between a display region of the first electronic device and identification information, the method further includes: receiving an operation of determining the display region by the user, and determining the display region; or automatically determining, based on an amount of identification information, a same quantity of display regions as the amount of identification information.

In some embodiments, the operation of determining the display region by the user includes, for example, a touch operation performed by the user on a display of the first electronic device, for example, an operation of dragging to change a size or a location of a display region selection box, or an operation of freely determining a display region.

In some embodiments, the first electronic device can determine, based on the amount of identification information, a quantity of second electronic devices used for display. It is assumed that a one-to-one correspondence between a display region and a second electronic device needs to be implemented currently, that is, each second electronic device displays a part of display content of the first electronic device (where for example, in the splicing screen display system, each display device displays a part of the first display content, and the complete and ordered first display content can be displayed only after combination). Therefore, after determining the amount of identification information, the first electronic device evenly divides, based on the quantity, an entire display region corresponding to a current display, to determine a same quantity of display regions.

According to any one of the first aspect or the foregoing implementations of the first aspect, before the determining a first correspondence between a display region of the first electronic device and identification information, the method further includes: displaying an identifier corresponding to the identification information, where the identifier includes a serial number of a second electronic device corresponding to the identification information and/or an icon of the second electronic device corresponding to the identification information.

In some embodiments, the first electronic device displays the identifier of the second electronic device, so that the user distinguishes between the second electronic devices and completes display configuration of the second electronic device.

In some embodiments, it is assumed that in a distributed display scenario, device types of the second electronic devices are different. The first electronic device may display an icon (for example, a product diagram or a schematic diagram of a cartoon of the second electronic device) indicating the device type, and the user may intuitively learn, based on the icon, a second electronic device corresponding to the icon. This improves user interests and improves user experience.

According to any one of first aspect or the foregoing implementations of the first aspect, the determining a first correspondence between a display region of the first electronic device and identification information includes: receiving an operation of dragging the identifier by the user to the display region, and determining the first correspondence between the display region and the identification information corresponding to the identifier.

In this way, display configuration of the second electronic device can be completed by using the simple drag operation of the user. In addition, the user may complete display configuration of the second electronic device on a single side by using the first electronic device. In addition, the first electronic device displays the display region and the dragged identifier, so that the user can intuitively learn a specific second electronic device with which the correspondence is established, so that the user confirms an identity of the second electronic device and corrects the correspondence. This effectively reduces difficulty in performing display configuration on the second electronic device by the user, and improves user experience.

According to any one of the first aspect or the foregoing implementations of the first aspect, the first correspondence includes one or more of the following correspondences: One display region corresponds to one piece of identification information, one display region corresponds to a plurality of pieces of identification information, and a plurality of display regions correspond to one piece of identification information.

In this way, the first electronic device can display, based on a user requirement, all or some display content that is same or different by using the second electronic device, so as to implement more flexible display configuration of the second electronic device.

According to a second aspect, a display method is provided, and is applied to a first electronic device. The method includes: displaying first display content; sending a first message, where the first message indicates to perform display configuration; obtaining first identification information corresponding to a first display device and second identification information corresponding to a second display device, where the first display device and the second display device belong to a same splicing screen display system; determining a second correspondence between a first display region of the first electronic device and the first identification information and a third correspondence between a second display region of the first electronic device and the second identification information, where display content corresponding to the first display region and the second display region is a part of the first display content, and the first display region is different from the second display region; sending a second message; and sending the first display content. The second message is used by the first display device to obtain the first display region corresponding to the first identification information from the second message based on the first identification information, and the first display region is used by the first display device to display the display content that is in the first display content and that corresponds to the first display region; and the second message is further used by the second display device to obtain the second display region corresponding to the second identification information from the second message based on the second identification information, and the second display region is used by the second display device to display the display content that is in the first display content and that corresponds to the second display region.

In some embodiments, the display method in this embodiment of this application may be further applied to a splicing screen display system. The splicing screen display system includes a plurality of display devices. The first electronic device can establish a one-to-one correspondence between a display region and each display device based on a user operation, so that display content displayed on each display device can form the complete and ordered first display content.

In this way, according to the display method provided in this embodiment of this application, a correspondence between a display region of a main control end device (namely, the first electronic device) and identification information of a controlled end device (namely, the first display device and the second display device) can be established, so that display content of the corresponding display region of the main control end device can be displayed by using different controlled end devices. This reduces operation difficulty of configuring the controlled end device by a user and effectively improves user experience.

According to the second aspect, the first message and/or the second message are/is sent in a broadcast manner or a multicast manner.

According to any one of the second aspect or the foregoing implementations of the second aspect, before the sending a second message, the method further includes: determining the second message based on the second correspondence and the third correspondence, where in the second message, the first identification information and the first display region that has the second correspondence with the first identification information are corresponding field content, and the second identification information and the second display region that has the third correspondence with the second identification information are corresponding field content.

According to any one of the second aspect or the foregoing implementations of the second aspect, the first display region includes pixel coordinates of the display content that is in the first display content and that corresponds to the first display region, and the second display region includes pixel coordinates of the display content that is in the first display content and that corresponds to the second display region.

According to any one of the second aspect or the foregoing implementations of the second aspect, the first message and/or the second message include/includes a first identification digit, and the first identification digit indicates that a message type is a display configuration message.

According to any one of the second aspect or the foregoing implementations of the second aspect, the obtaining first identification information corresponding to a first display device and second identification information corresponding to a second display device includes: receiving a third message sent by the first display device in response to the first message, where the third message carries the first identification information; and receiving a fourth message sent by the second display device in response to the first message, where the fourth message carries the second identification information.

According to any one of the second aspect or the foregoing implementations of the second aspect, the determining a second correspondence between a first display region of the first electronic device and the first identification information and a third correspondence between a second display region of the first electronic device and the second identification information includes: determining the first display region from display regions of a first quantity based on a first spatial location of the first display device corresponding to the first identification information in the splicing screen display system, and determining the second correspondence between the first display region and the first identification information; and determining the second display region from the display regions of the first quantity based on a second spatial location of the second display device corresponding to the second identification information in the splicing screen display system, and determining the third correspondence between the second display region and the second identification information. The first quantity is a quantity of display devices included in the splicing screen display system, the display regions of the first quantity include the first display region and the second display region, and display content corresponding to the display regions of the first quantity forms the first display content.

In some implementations, each display device in the splicing screen display system has a corresponding spatial location relationship, and the complete and ordered first display content can be formed only when an image is displayed based on a correct spatial location relationship. In a process of obtaining identification information of each display device, the first electronic device can obtain a corresponding spatial location relationship. Therefore, a correct correspondence can be established.

According to any one of the second aspect or the foregoing implementations of the second aspect, the determining a second correspondence between a first display region of the first electronic device and the first identification information and a third correspondence between a second display region of the first electronic device and the second identification information includes: determining that the splicing screen display system includes display devices of the first quantity; determining a first segmentation policy corresponding to the first quantity, where the first segmentation policy is used to segment the first display content into the display regions of the first quantity; determining the first display region from the display regions of the first quantity based on the first spatial location of the first display device corresponding to the first identification information in the splicing screen display system, and determining the second correspondence between the first display region and the first identification information; and determining the second display region from the display regions of the first quantity based on the second spatial location of the second display device corresponding to the second identification information in the splicing screen display system, and determining the third correspondence between the second display region and the second identification information.

According to any one of the second aspect or the foregoing implementations of the second aspect, the second correspondence includes that one first display region corresponds to one piece of first identification information, and the third correspondence includes that one second display region corresponds to one piece of second identification information.

According to any one of the second aspect or the foregoing implementations of the second aspect, the determining a second correspondence between a first display region of the first electronic device and the first identification information and a third correspondence between a second display region of the first electronic device and the second identification information includes: based on an amount of received identification information, determining the first display region that has the second correspondence with the first identification information, and determining the second display region that has the third correspondence with the second identification information.

According to any one of the second aspect or the foregoing implementations of the second aspect, the method further includes: receiving an operation of adjusting a correspondence by a user, and determining a fourth correspondence between a third display region of the first electronic device and the first identification information, and/or a fifth correspondence between a fourth display region of the first electronic device and the second identification information, where the third display region is different from the first display region, and the fourth display region is different from the second display region.

According to any one of the second aspect or the foregoing implementations of the second aspect, the method further includes: determining an updated second message based on the fourth correspondence and/or the fifth correspondence; and sending the updated second message. The updated second message is used by the first display device to obtain the third display region corresponding to the first identification information from the updated second message based on the first identification information, and the third display region is used by the first display device to display display content that is in the first display content and that corresponds to the third display region; and the updated second message is further used by the second display device to obtain the fourth display region corresponding to the second identification information from the updated second message based on the second identification information, and the fourth display region is used by the second display device to display display content that is in the first display content and that corresponds to the fourth display region.

In some embodiments, in the splicing screen display system, if the first electronic device fails to obtain a spatial location relationship between the display devices, the first electronic device may first randomly configure a corresponding display region for each display device. Then, in a process of displaying an image by each display device, the user can intuitively learn which display devices encounter a display error. The first electronic device receives the operation of adjusting the correspondence by the user, so that the correspondence can be quickly adjusted, and display setting of each display device is completed.

In this way, the first electronic device randomly matches the correspondence between the display region and the second electronic device, so that the user does not need to establish the correspondence one by one. This reduces user operations. In addition, in an intuitive display manner, the user is helped to correct the correspondence, so as to reduce user operation difficulty, increase interests of a user operation, improve efficiency of establishing the correspondence, and improve user experience.

For technical effects corresponding to any one of the second aspect or the implementations of the second aspect, refer to technical effects corresponding to any one of the first aspect or the implementations of the first aspect. Details are not described herein again.

According to a third aspect, a display method is provided, and is applied to a second electronic device. The method includes: receiving a first message, where the first message indicates to perform display configuration; sending identification information of the second electronic device to a first electronic device; receiving a second message; receiving first display content; obtaining a display region corresponding to the identification information from the second message based on the identification information, where a first correspondence exists between the identification information and the display region, and the first correspondence is determined by the first electronic device; and displaying display content that is in the first display content and that corresponds to the display region.

According to the third aspect, before the receiving a first message, the method further includes: enabling a message listening mode, where the message listening mode is used to listen to a broadcast message or a multicast message.

In this way, the second electronic device receives the first message and the second message by enabling the message listening mode.

According to any one of the third aspect or the foregoing implementations of the third aspect, the first message and/or the second message are/is received in a broadcast manner or a multicast manner.

According to any one of the third aspect or the foregoing implementations of the third aspect, the obtaining a display region corresponding to the identification information from the second message based on the identification information includes: determining, in the second message, an identification information field that matches the identification information; and obtaining the display region from a field that is in the second message and that corresponds to the identification information field.

According to any one of the third aspect or the foregoing implementations of the third aspect, the display region includes pixel coordinates of the display content that is in the first display content and that corresponds to the display region.

According to any one of the third aspect or the foregoing implementations of the third aspect, the displaying display content that is in the first display content and that corresponds to the display region includes: determining to-bedisplayed content in the first display content based on the pixel coordinates; and displaying the to-be-displayed content.

According to any one of the third aspect or the foregoing implementations of the third aspect, the first message and/or the second message include/includes a first identification digit, and the first identification digit indicates that a message type is a display configuration message.

According to any one of the third aspect or the foregoing implementations of the third aspect, the sending identification information of the second electronic device to a first electronic device includes: displaying the identification information of the second electronic device on a display; or sending a third message to the first electronic device, where the third message carries the identification information.

For technical effects corresponding to any one of the third aspect or the implementations of the third aspect, refer to technical effects corresponding to any one of the first aspect or the implementations of the first aspect. Details are not described herein again.

According to a fourth aspect, a first electronic device is provided. The first electronic device includes a processor and a memory, where the memory is coupled to the processor, the memory is configured to store computer program code, the computer program code includes computer instructions, and when the processor reads the computer instructions from the memory, the first electronic device is enabled to perform the following operations: displaying first display content; sending a first message, where the first message indicates to perform display configuration; obtaining identification information of a second electronic device, where there are a plurality of second electronic devices, and each second electronic device corresponds to one piece of identification information; determining a first correspondence between a display region of the first electronic device and identification information, where there are a plurality of display regions, and display content corresponding to each display region of the first electronic device is a part or all of the first display content; sending a second message; and sending the first display content. The second message is used by the second electronic device to obtain a display region corresponding to the identification information from the second message based on the identification information, and the display region is used by the second electronic device to display display content that is in the first display content and that corresponds to the display region.

According to the fourth aspect, the first message and/or the second message are/is sent in a broadcast manner or a multicast manner.

According to any one of the fourth aspect or the foregoing implementations of the fourth aspect, when the processor reads the computer instructions from the memory, the first electronic device is further enabled to perform the following operation: determining the second message based on the first correspondence, where in the second message, each piece of identification information and a display region that has the first correspondence with the identification information are corresponding field content.

According to any one of the fourth aspect or the foregoing implementations of the fourth aspect, the display region includes pixel coordinates of the display content that is in the first display content and that corresponds to the display region.

According to any one of the fourth aspect or the foregoing implementations of the fourth aspect, the first message and/or the second message include/includes a first identification digit, and the first identification digit indicates that a message type is a display configuration message.

According to any one of the fourth aspect or the foregoing implementations of the fourth aspect, the obtaining identification information of a second electronic device includes: An image collecting apparatus in the first electronic device collects the identification information displayed on a display of the second electronic device, where the identification information is presented in one or more manners of a two-dimensional code, an image, and/or a character. Alternatively, a third message sent by the second electronic device in response to the first message is received, where the third message carries the identification information.

According to any one of the fourth aspect or the foregoing implementations of the fourth aspect, when the processor reads the computer instructions from the memory, the first electronic device is further enabled to perform the following operations: receiving an operation of determining the display region by a user, and determining the display region; or automatically determining, based on an amount of identification information, a same quantity of display regions as the amount of identification information.

According to any one of the fourth aspect or the foregoing implementations of the fourth aspect, when the processor reads the computer instruction from the memory, the first electronic device further performs the following operation: displaying an identifier corresponding to the identification information, where the identifier includes a serial number of a second electronic device corresponding to the identification information and/or an icon of the second electronic device corresponding to the identification information.

According to any one of fourth aspect or the foregoing implementations of the fourth aspect, the determining a first correspondence between a display region of the first electronic device and identification information includes: receiving an operation of dragging the identifier by the user to the display region, and determining the first correspondence between the display region and the identification information corresponding to the identifier.

According to any one of the fourth aspect or the foregoing implementations of the fourth aspect, the first correspondence includes one or more of the following correspondences: One display region corresponds to one piece of identification information, one display region corresponds to a plurality of pieces of identification information, and a plurality of display regions correspond to one piece of identification information.

For technical effects corresponding to any one of the fourth aspect or the implementations of the fourth aspect, refer to technical effects corresponding to any one of the first aspect or the implementations of the first aspect. Details are not described herein again.

According to a fifth aspect, a first electronic device is provided. The first electronic device includes a processor and a memory, where the memory is coupled to the processor, the memory is configured to store computer program code, the computer program code includes computer instructions, and when the processor reads the computer instructions from the memory, the first electronic device is enabled to perform the following operations: displaying first display content; sending a first message, where the first message indicates to perform display configuration; obtaining first identification information corresponding to a first display device and second identification information corresponding to a second display device, where the first display device and the second display device belong to a same splicing screen display system; determining a second correspondence between a first display region of the first electronic device and the first identification information and a third correspondence between a second display region of the first electronic device and the second identification information, where display content corresponding to the first display region and the second display region is a part of the first display content, and the first display region is different from the second display region; sending a second message; and sending the first display content. The second message is used by the first display device to obtain the first display region corresponding to the first identification information from the second message based on the first identification information, and the first display region is used by the first display device to display the display content that is in the first display content and that corresponds to the first display region; and the second message is further used by the second display device to obtain the second display region corresponding to the second identification information from the second message based on the second identification information, and the second display region is used by the second display device to display the display content that is in the first display content and that corresponds to the second display region.

According to the fifth aspect, the first message and/or the second message are/is sent in a broadcast manner or a multicast manner.

According to any one of the fifth aspect or the foregoing implementations of the fifth aspect, before the sending a second message, the method further includes: determining the second message based on the second correspondence and the third correspondence, where in the second message, the first identification information and the first display region that has the second correspondence with the first identification information are corresponding field content, and the second identification information and the second display region that has the third correspondence with the second identification information are corresponding field content.

According to any one of the fifth aspect or the foregoing implementations of the fifth aspect, the first display region includes pixel coordinates of the display content that is in the first display content and that corresponds to the first display region, and the second display region includes pixel coordinates of the display content that is in the first display content and that corresponds to the second display region.

According to any one of the fifth aspect or the foregoing implementations of the fifth aspect, the first message and/or the second message include/includes a first identification digit, and the first identification digit indicates that a message type is a display configuration message.

According to any one of the fifth aspect or the foregoing implementations of the fifth aspect, the obtaining first identification information corresponding to a first display device and second identification information corresponding to a second display device includes: receiving a third message sent by the first display device in response to the first message, where the third message carries the first identification information; and receiving a fourth message sent by the second display device in response to the first message, where the fourth message carries the second identification information.

According to any one of the fifth aspect or the foregoing implementations of the fifth aspect, the determining a second correspondence between a first display region of the first electronic device and the first identification information and a third correspondence between a second display region of the first electronic device and the second identification information includes: determining the first display region from display regions of a first quantity based on a first spatial location of the first display device corresponding to the first identification information in the splicing screen display system, and determining the second correspondence between the first display region and the first identification information; and determining the second display region from the display regions of the first quantity based on the second spatial location of the second display device corresponding to the second identification information in the splicing screen display system, and determining the third correspondence between the second display region and the second identification information. The first quantity is a quantity of display devices included in the splicing screen display system, the display regions of the first quantity include the first display region and the second display region, and display content corresponding to the display regions of the first quantity forms the first display content.

According to any one of the fifth aspect or the foregoing implementations of the fifth aspect, the determining a second correspondence between a first display region of the first electronic device and the first identification information and a third correspondence between a second display region of the first electronic device and the second identification information includes: determining that the splicing screen display system includes display devices of the first quantity; determining a first segmentation policy corresponding to the first quantity, where the first segmentation policy is used to segment the first display content into the display regions of the first quantity; determining the first display region from the display regions of the first quantity based on the first spatial location of the first display device corresponding to the first identification information in the splicing screen display system, and determining the second correspondence between the first display region and the first identification information; and determining the second display region from the display regions of the first quantity based on the second spatial location of the second display device corresponding to the second identification information in the splicing screen display system, and determining the third correspondence between the second display region and the second identification information.

According to any one of the fifth aspect or the foregoing implementations of the fifth aspect, the second correspondence includes that one first display region corresponds to one piece of first identification information, and the third correspondence includes that one second display region corresponds to one piece of second identification information.

According to any one of the fifth aspect or the foregoing implementations of the fifth aspect, the determining a second correspondence between a first display region of the first electronic device and the first identification information and a third correspondence between a second display region of the first electronic device and the second identification information includes: based on an amount of received identification information, determining the first display region that has the second correspondence with the first identification information, and determining the second display region that has the third correspondence with the second identification information.

According to any one of the fifth aspect or the foregoing implementations of the fifth aspect, when the processor reads the computer instructions from the memory, the first electronic device is further enabled to perform the following operations: receiving an operation of adjusting a correspondence by a user, and determining a fourth correspondence between a third display region of the first electronic device and the first identification information, and/or a fifth correspondence between a fourth display region of the first electronic device and the second identification information, where the third display region is different from the first display region, and the fourth display region is different from the second display region.

According to any one of the fifth aspect or the foregoing implementations of the fifth aspect, when the processor reads the computer instructions from the memory, the first electronic device is further enabled to perform the following operations: determining an updated second message based on the fourth correspondence and/or the fifth correspondence; and sending the updated second message. The updated second message is used by the first display device to obtain the third display region corresponding to the first identification information from the updated second message based on the first identification information, and the third display region is used by the first display device to display display content that is in the first display content and that corresponds to the third display region; and the updated second message is further used by the second display device to obtain the fourth display region corresponding to the second identification information from the updated second message based on the second identification information, and the fourth display region is used by the second display device to display display content that is in the first display content and that corresponds to the fourth display region.

For technical effects corresponding to any one of the fifth aspect or the implementations of the fifth aspect, refer to technical effects corresponding to any one of the second aspect or the implementations of the second aspect. Details are not described herein again.

According to a sixth aspect, a second electronic device is provided. The second electronic device includes a processor and a memory, where the memory is coupled to the processor, the memory is configured to store computer program code, the computer program code includes computer instructions, and when the processor reads the computer instructions from the memory, the second electronic device is enabled to perform the following operations: receiving a first message, where the first message indicates to perform display configuration; sending identification information of the second electronic device to a first electronic device; receiving a second message; receiving first display content; obtaining a display region corresponding to the identification information from the second message based on the identification information, where a first correspondence exists between the identification information and the display region, and the first correspondence is determined by the first electronic device; and displaying display content that is in the first display content and that corresponds to the display region.

According to any one of the sixth aspect or the foregoing implementations of the sixth aspect, when the processor reads the computer instructions from the memory, the second electronic device is further enabled to perform the following operations: enabling a message listening mode, where the message listening mode is used to listen to a broadcast message or a multicast message.

According to any one of the sixth aspect or the foregoing implementations of the sixth aspect, the first message and/or the second message are/is received in a broadcast manner or a multicast manner.

According to any one of the sixth aspect or the foregoing implementations of the sixth aspect, the obtaining a display region corresponding to the identification information from the second message based on the identification information includes: determining, in the second message, an identification information field that matches the identification information; and obtaining the display region from a field that is in the second message and that corresponds to the identification information field.

According to any one of the sixth aspect or the foregoing implementations of the sixth aspect, the display region includes pixel coordinates of the display content that is in the first display content and that corresponds to the display region.

According to any one of the sixth aspect or the foregoing implementations of the sixth aspect, the displaying display content that is in the first display content and that corresponds to the display region includes: determining to-be-displayed content in the first display content based on the pixel coordinates; and displaying the to-be-displayed content.

According to any one of the sixth aspect or the foregoing implementations of the sixth aspect, the first message and/or the second message include/includes a first identification digit, and the first identification digit indicates that a message type is a display configuration message.

According to any one of the sixth aspect or the foregoing implementations of the sixth aspect, the sending identification information of the second electronic device to a first electronic device includes: displaying the identification information of the second electronic device on a display; or sending a third message to the first electronic device, where the third message carries the identification information.

For technical effects corresponding to any one of the sixth aspect or the implementations of the sixth aspect, refer to technical effects corresponding to any one of the third aspect or the implementations of the third aspect. Details are not described herein again.

According to a seventh aspect, an embodiment of this application provides an electronic device. The electronic device has a function of implementing the display method according to any one of the first aspect and the possible implementations of the first aspect; the electronic device has a function of implementing the display method according to any one of the second aspect and the possible implementations of the second aspect; or the electronic device has a function of implementing the display method according to any one of the third aspect and the possible implementations of the third aspect. The function may be implemented by hardware, or may be implemented by hardware executing corresponding software. The hardware or the software includes one or more modules corresponding to the function.

For technical effects corresponding to any one of the seventh aspect or the implementations of the seventh aspect, refer to technical effects corresponding to any one of the first aspect or the implementations of the first aspect. Details are not described herein again.

According to an eighth aspect, a computer-readable storage medium is provided. The computer-readable storage medium stores a computer program (which may also be referred to as instructions or code). When the computer program is executed by an electronic device, the electronic device is enabled to perform the method according to any one of the first aspect or the implementations of the first aspect, the electronic device is enabled to perform the method according to any one of the second aspect or the implementations of the second aspect, or the electronic device is enabled to perform the method according to any one of the third aspect or the implementations of the third aspect.

For technical effects corresponding to any one of the eighth aspect or the implementations of the eighth aspect, refer to technical effects corresponding to any one of the first aspect or the implementations of the first aspect. Details are not described herein again.

According to a ninth aspect, an embodiment of this application provides a computer program product. When the computer program product runs on an electronic device, the electronic device is enabled to perform the method according to any one of the first aspect or the implementations of the first aspect, the electronic device is enabled to perform the method according to any one of the second aspect or the implementations of the second aspect, or the electronic device is enabled to perform the method according to any one of the third aspect or the implementations of the third aspect.

For technical effects corresponding to any one of the ninth aspect or the implementations of the ninth aspect, refer to technical effects corresponding to any one of the first aspect or the implementations of the first aspect. Details are not described herein again.

According to a tenth aspect, an embodiment of this application provides a circuit system, where the circuit system includes a processing circuit. The processing circuit is configured to perform the method according to any one of the first aspect or the implementations of the first aspect; the processing circuit is configured to perform the method according to any one of the second aspect or the implementations of the second aspect; or the processing circuit is configured to perform the method according to any one of the third aspect or the implementations of the third aspect.

For technical effects corresponding to any one of the tenth aspect or the implementations of the tenth aspect, refer to technical effects corresponding to any one of the first aspect or the implementations of the first aspect. Details are not described herein again.

According to an eleventh aspect, an embodiment of this application provides a chip system, including at least one processor and at least one interface circuit. The at least one interface circuit is configured to perform receiving and sending functions, and send instructions to the at least one processor. When the at least one processor executes the instructions, the at least one processor performs the method according to any one of the first aspect or the implementations of the first aspect, the at least one processor performs the method according to any one of the second aspect or the implementations of the second aspect, or the at least one processor performs the method according to any one of the third aspect or the implementations of the third aspect.

For technical effects corresponding to any one of the eleventh aspect or the implementations of the eleventh aspect, refer to technical effects corresponding to any one of the first aspect or the implementations of the first aspect. Details are not described herein again.

According to a twelfth aspect, a method for determining projection display content is provided, and the method is applied to a first electronic device. The method includes: displaying a first user interface, where the first user interface includes first display content, a first closed box, and a second closed box, and display content in the first closed box and the second closed box is a part or all of the first display content; displaying a second user interface, where the second user interface includes the first display content, the first closed box, the second closed box, a first control, and a second control, the first control and the second control are movable controls, the first control corresponds to a second electronic device, the second control corresponds to a third electronic device, and the second electronic device and the third electronic device are projection display content receiving devices of the first electronic device; and receiving a first operation performed by a user on the first control and the second control, and displaying the first control and/or the second control in the first closed box and/or the second closed box, where display content in a closed box in which the first control is located is display content of the second electronic device, and display content in a closed box in which the second control is located is display content of the third electronic device.

According to the twelfth aspect, before the displaying a first user interface, the method further includes: displaying a third user interface, where the third user interface includes a first initial closed box and the first display content; and receiving a second operation performed by the user on the first initial closed box, and displaying the first closed box after changing a location and/or a size of the first initial closed box.

According to any one of the twelfth aspect or the foregoing implementations of the twelfth aspect, the first closed box and/or the second closed box are/is determined in response to an operation of drawing a closed track by the user.

According to any one of the twelfth aspect or the foregoing implementations of the twelfth aspect, before the displaying a first user interface, the method further includes: determining, based on a quantity of projection display content receiving devices, a same quantity of closed boxes as the quantity of projection display content receiving devices, where the closed boxes include the first closed box and the second closed box.

According to any one of the twelfth aspect or the foregoing implementations of the twelfth aspect, the first control includes a serial number and/or an icon of the second electronic device, and the second control includes a serial number and/or an icon of the third electronic device.

According to any one of the twelfth aspect or the foregoing implementations of the twelfth aspect, a location relationship between the first control and the second control on the second user interface corresponds to a spatial location relationship between the second electronic device and the third electronic device.

According to any one of the twelfth aspect or the foregoing implementations of the twelfth aspect, the first operation includes one or more of a drag operation, a touch and hold operation, and a tap operation.

For technical effects corresponding to any one of the twelfth aspect or the implementations of the twelfth aspect, refer to technical effects corresponding to any one of the first aspect or the implementations of the first aspect. Details are not described herein again.

According to a thirteenth aspect, a first electronic device is provided. The first electronic device includes: a processor, a memory, and a display. The memory and the display are coupled to the processor. The memory is configured to store computer program code. The computer program code includes computer instructions. When the processor reads the computer instructions from the memory, the first electronic device is enabled to perform the following operations: displaying a first user interface, where the first user interface includes first display content, a first closed box, and a second closed box, and display content in the first closed box and the second closed box is a part or all of the first display content; displaying a second user interface, where the second user interface includes the first display content, the first closed box, the second closed box, a first control, and a second control, the first control and the second control are movable controls, the first control corresponds to a second electronic device, the second control corresponds to a third electronic device, and the second electronic device and the third electronic device are projection display content receiving devices of the first electronic device; and receiving a first operation performed by a user on the first control and the second control, and displaying the first control and/or the second control in the first closed box and/or the second closed box, where display content in a closed box in which the first control is located is display content of the second electronic device, and display content in a closed box in which the second control is located is display content of the third electronic device.

According to the thirteenth aspect, before the displaying a first user interface, when the processor reads the computer instructions from the memory, the first electronic device is further enabled to perform the following operations: displaying a third user interface, where the third user interface includes a first initial closed box and the first display content; receiving a second operation performed by the user on the first initial closed box, and displaying the first closed box after changing a location and/or a size of the first initial closed box.

According to any one of the thirteenth aspect or the foregoing implementations of the thirteenth aspect, the first closed box and/or the second closed box are/is determined in response to an operation of drawing a closed track by the user.

According to any one of the thirteenth aspect or the foregoing implementations of the thirteenth aspect, when the processor reads the computer instructions from the memory, the first electronic device is further enabled to perform the following operation: determining, based on a quantity of projection display content receiving devices, a same quantity of closed boxes as the quantity of projection display content receiving devices, where the closed boxes include the first closed box and the second closed box.

According to any one of the thirteenth aspect or the foregoing implementations of the thirteenth aspect, the first control includes a serial number and/or an icon of the second electronic device, and the second control includes a serial number and/or an icon of the third electronic device.

According to any one of the thirteenth aspect or the foregoing implementations of the thirteenth aspect, a location relationship between the first control and the second control on the second user interface corresponds to a spatial location relationship between the second electronic device and the third electronic device.

According to any one of the thirteenth aspect or the foregoing implementations of the thirteenth aspect, the first operation includes one or more of a drag operation, a touch and hold operation, and a tap operation.

For technical effects corresponding to any one of the thirteenth aspect or the implementations of the thirteenth aspect, refer to technical effects corresponding to any one of the twelfth aspect or the implementations of the twelfth aspect. Details are not described herein again.

According to a fourteenth aspect, an embodiment of this application provides an electronic device. The electronic device has a function of implementing the display method according to any one of the twelfth aspect and the possible implementations of the twelfth aspect. The function may be implemented by hardware, or may be implemented by hardware executing corresponding software. The hardware or the software includes one or more modules corresponding to the function.

For technical effects corresponding to any one of the fourteenth aspect or the implementations of the fourteenth aspect, refer to technical effects corresponding to any one of the twelfth aspect or the implementations of the twelfth aspect. Details are not described herein again.

According to a fifteenth aspect, a computer-readable storage medium is provided. The computer-readable storage medium stores a computer program (which may also be referred to as instructions or code), and when the computer program is executed by an electronic device, the electronic device is enabled to perform the method according to any one of the twelfth aspect or the implementations of the first aspect.

For technical effects corresponding to any one of the fifteenth aspect or the implementations of the fifteenth aspect, refer to technical effects corresponding to any one of the twelfth aspect or the implementations of the twelfth aspect. Details are not described herein again.

According to a sixteenth aspect, an embodiment of this application provides a computer program product. When the computer program product runs on an electronic device, the electronic device is enabled to perform the method according to any one of the twelfth aspect or the implementations of the twelfth aspect.

For technical effects corresponding to any one of the sixteenth aspect or the implementations of the sixteenth aspect, refer to technical effects corresponding to any one of the twelfth aspect or the implementations of the twelfth aspect. Details are not described herein again.

According to a seventeenth aspect, an embodiment of this application provides a circuit system, where the circuit system includes a processing circuit, and the processing circuit is configured to perform the method according to any one of the twelfth aspect or the implementations of the twelfth aspect.

For technical effects corresponding to any one of the seventeenth aspect or the implementations of the seventeenth aspect, refer to technical effects corresponding to any one of the twelfth aspect or the implementations of the twelfth aspect. Details are not described herein again.

According to an eighteenth aspect, an embodiment of this application provides a chip system, including at least one processor and at least one interface circuit. The at least one interface circuit is configured to perform receiving and sending functions, and send instructions to the at least one processor. When the at least one processor executes the instructions, the at least one processor performs the method according to any one of the twelfth aspect or the implementations of the twelfth aspect.

For technical effects corresponding to any one of the eighteenth aspect or the implementations of the eighteenth aspect, refer to technical effects corresponding to any one of the twelfth aspect or the implementations of the twelfth aspect. Details are not described herein again.

BRIEF DESCRIPTION OF DRAWINGS

FIG. 24 is a flowchart 3 of a method for determining projection display content according to an embodiment of this application;

FIG. 25 is a schematic diagram of a structure of a first electronic device according to an embodiment of this application.

DESCRIPTION OF EMBODIMENTS

Figure 1A:
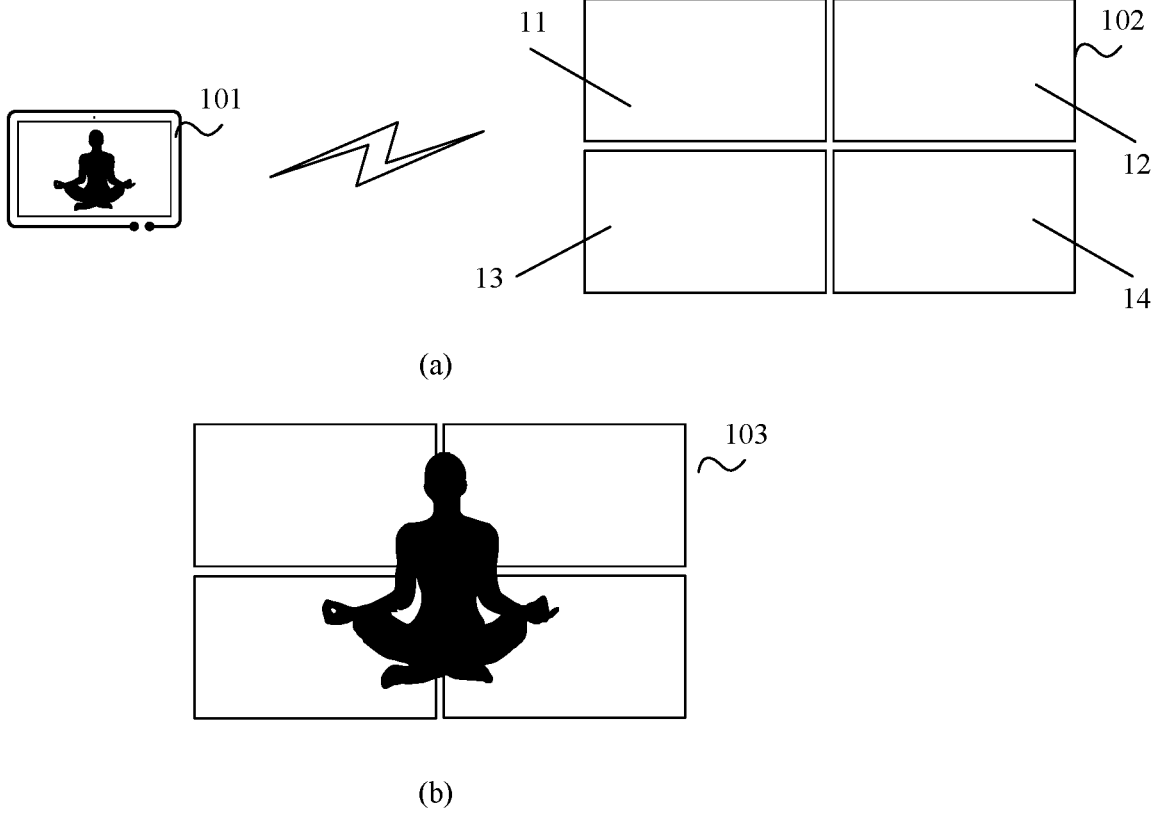
FIG. 1A is a schematic diagram 1 of a scenario according to an embodiment of this application.

The following describes the technical solutions in embodiments of this application with reference to the accompanying drawings in embodiments of this application. In the descriptions of embodiments of this application, terms used in the following embodiments are merely intended to describe purposes of specific embodiments, but are not intended to limit this application. The terms "one", "a", and "this" of singular forms used in this specification and the appended claims of this application are intended to include expressions such as "one or more", unless otherwise specified in the context clearly. It should be further understood that in the following embodiments of this application, "at least one" and "one or more" mean one, two, or more.

Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. Terms "include", "contain", "have", and variants of the terms all mean "include but are not limited to", unless otherwise specifically emphasized in other ways. The term "connection" includes a direct connection and an indirect connection, unless otherwise indicated. "First" and "second" are merely intended for a purpose of description, and shall not be understood as an indication or implication of relative importance or implicit indication of the number of indicated technical features.

In embodiments of this application, the word "example", "for example", or the like is used to represent giving an example, an illustration, or a description. Any embodiment or design scheme described as "example" or "for example" in embodiments of this application should not be explained as being more preferred or having more advantages than another embodiment or design scheme. Exactly, use of the word "example", "for example", or the like is intended to present a relative concept in a specific manner.

In some scenarios, in response to a user operation, a main control end device sends display content (such as an image or a video) of the main control end device to a controlled end device for display. The controlled end device is, for example, each display included in a splicing screen, so that the main control end device uses the splicing screen to implement an effect of magnifying and displaying to-be-displayed content. Alternatively, a plurality of controlled end devices and the main control end device form a distributed display system, and the main control end device determines, based on the user operation, a display region of a split display, so that different controlled end devices correspondingly display display content in different display regions of the main control end device. Each controlled end device corresponds to unique identification information. It should be noted that the splicing screen may be understood as a display system including a plurality of displays, where each display may be used as an independent display device, and the displays (or the display devices) are combined to form a large display of the splicing screen. In some embodiments, each display in the splicing screen may be further described as a sub-display, and the sub-displays are spliced to form a complete display of the splicing screen.

In the foregoing scenario, the main control end device needs to determine a location of each controlled end device, so as to send corresponding display content to a correct display location. This ensures a display effect.

For example, the foregoing display scenario is described by using an example in which the controlled end device is a display in the splicing screen. In a scenario shown in (a) in FIG. 1A, it is assumed that the main control end device is a tablet computer (or referred to as a "PAD") 101, and the controlled end device is four displays included in a splicing screen 102, which are respectively a display 11, a display 12, a display 13, and a display 14. If the PAD 101 needs to send display content to the display 11, the display 12, the display 13, and the display 14 for display, a correspondence between each video port and each display in the splice screen 102 needs to be determined before the display content is sent. The PAD 101 splits the to-be-displayed content based on a location relationship between the displays in the splice screen 102, and then sends, through the video port based on the correspondence, the split data to the corresponding displays of the splice screen 102 for display. As shown in (b) in FIG. 1A, the displays in the splicing screen can display complete and ordered display content shown on an interface 103 only after obtaining correct display content. For example, the display 11 in an upper left corner of the splicing screen 102, the display 12 in an upper right corner of the splicing screen 102, the display 13 in a lower left corner of the splicing screen 102, and the display 14 in a lower right corner of the splicing screen 102 respectively display display content corresponding to quarter regions in an upper left corner, an upper right corner, a lower left corner, and a lower right corner in the display content of the PAD 101.

Figure 1B:
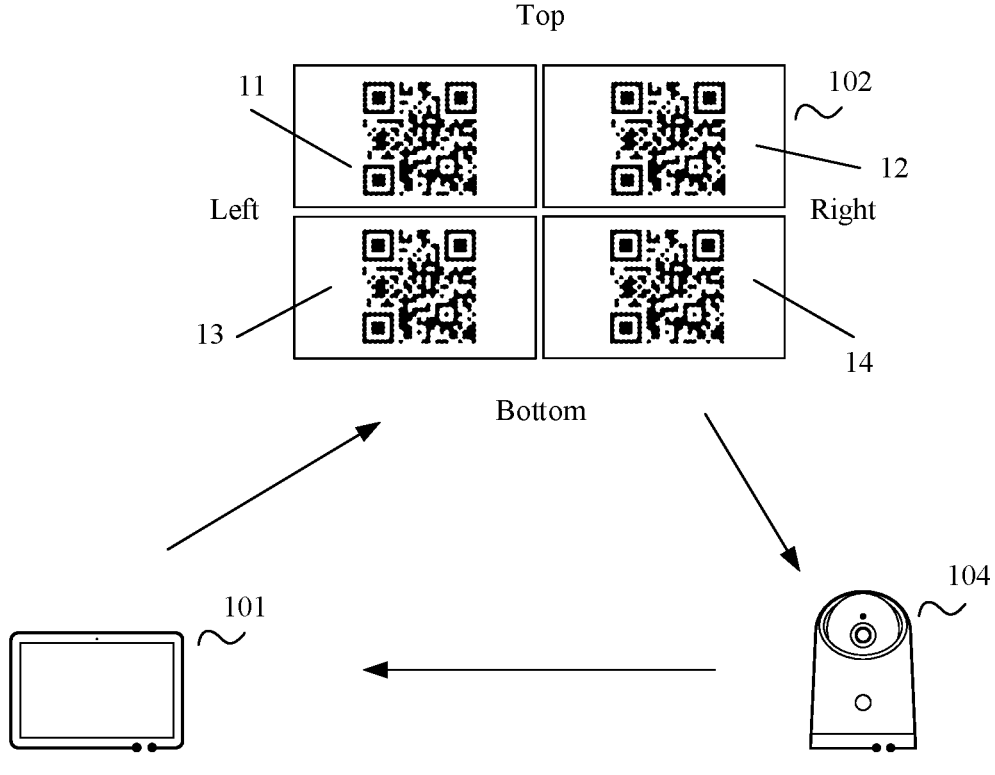
FIG. 1B is a schematic diagram 2 of a scenario according to an embodiment of this application.

In some embodiments, in a process of establishing a correspondence between each video port of the main control end device and each display (namely, the controlled end device) in the splicing screen, as shown in (a) in FIG. 1A, the PAD 101 (namely, the main control end device) separately sends data carrying a video port number to the display 11, the display 12, the display 13, and the display 14. As shown in FIG. 1B, it is assumed that the data is two-dimensional code data. After receiving the data carrying the video port number, each display displays a corresponding two-dimensional code, where each two-dimensional code represents a different video port number. Then, an image collecting apparatus 104 collects a splicing screen image displayed on the splicing screen 102, and sends the collected splicing screen image to the PAD 101. The splicing screen image is a corresponding complete image obtained by splicing two-dimensional code images of the video ports displayed on the splicing screen 102, that is, includes a location relationship between the two-dimensional code images. After receiving the splicing screen image, the PAD 101 splits the splicing screen image to obtain sub-images and spatial location information of the corresponding displays, identifies each sub-image (that is, scans a two-dimensional code in the sub-image), determines a corresponding video port number, establishes a correspondence between spatial location information of each display and a port number of a corresponding video port, and stores the correspondence, to complete setting of each display. Then, after the PAD 101 splits displayed display content data into four pieces to obtain four pieces of split image data, the PAD 101 outputs image data that carries the video port number to each display, so that the splicing screen 102 can correctly display the image. For example, after the PAD 101 receives and splits the splicing screen image sent by the image collecting apparatus 104, if the PAD 101 identifies that a video port number corresponding to a sub-image on the upper left of the split splicing screen image is a port number 1, the PAD 101 determines that image data output by using the port number 1 corresponds to the display 11 shown in FIG. 1B (that is, corresponds to a display on the upper left). Then, the PAD 101 establishes a correspondence between the port number 1 and the display 11. Then, in an image data transmission process, the PAD 101 sends, through the video port with the port number 1, the image data on the upper left of split image data to the display 11 for display.

In the foregoing example, compared with a manner in which a control apparatus (for example, a remote control) is used to set the displays of the splicing screen one by one, a manner in which the main control end device establishes a correspondence between the display content and the displays of the splicing screen simplifies a step of setting the splicing screen, but still depends on another additional device (the image collecting apparatus 104 shown in FIG. 1B) in the process of establishing the correspondence. In addition, after processing the to-be-displayed content, the main control end device needs to send the to-be-displayed content to a corresponding display based on the correspondence (where for example, after splitting the image data, the main control end device sends the split image data to a corresponding controlled end device through a video port). This increases image processing power consumption. In addition, a data transmission link needs to exist between the main control end device and each display. If the display content is dynamically changing content such as a video, the main control end device needs to split and separately send each frame in the video. This occupies computing resources of the main control end device and increases data transmission overheads.

In addition, in the distributed display system, because a location of each controlled end device is not determined, display content of each display cannot be collected at a time, that is, spatial location information of each controlled end device cannot be determined. Therefore, the foregoing method for setting the display of the splicing screen is not applicable to the distributed display system. As a result, in the distributed display system, display setting of the controlled end devices still needs to be performed by the control apparatus one by one, and user operation difficulty is still high. This affects user experience.

Therefore, an embodiment of this application provides a display method. The main control end device can obtain an identifier of each display corresponding to a controlled end device, establish a correspondence between the identifier and each display region obtained by splitting a display of the main control end device, and send the correspondence to the controlled end device. In a process of displaying an image by the controlled end devices, the main control end device directly sends the entire display content that is not split to the controlled end devices, and each controlled end device displays display content in a corresponding display region based on the correspondence. Therefore, display setting of the controlled end devices may be completed on the main control end device side. This reduces user operation difficulty and improves user experience.

Figure 2:
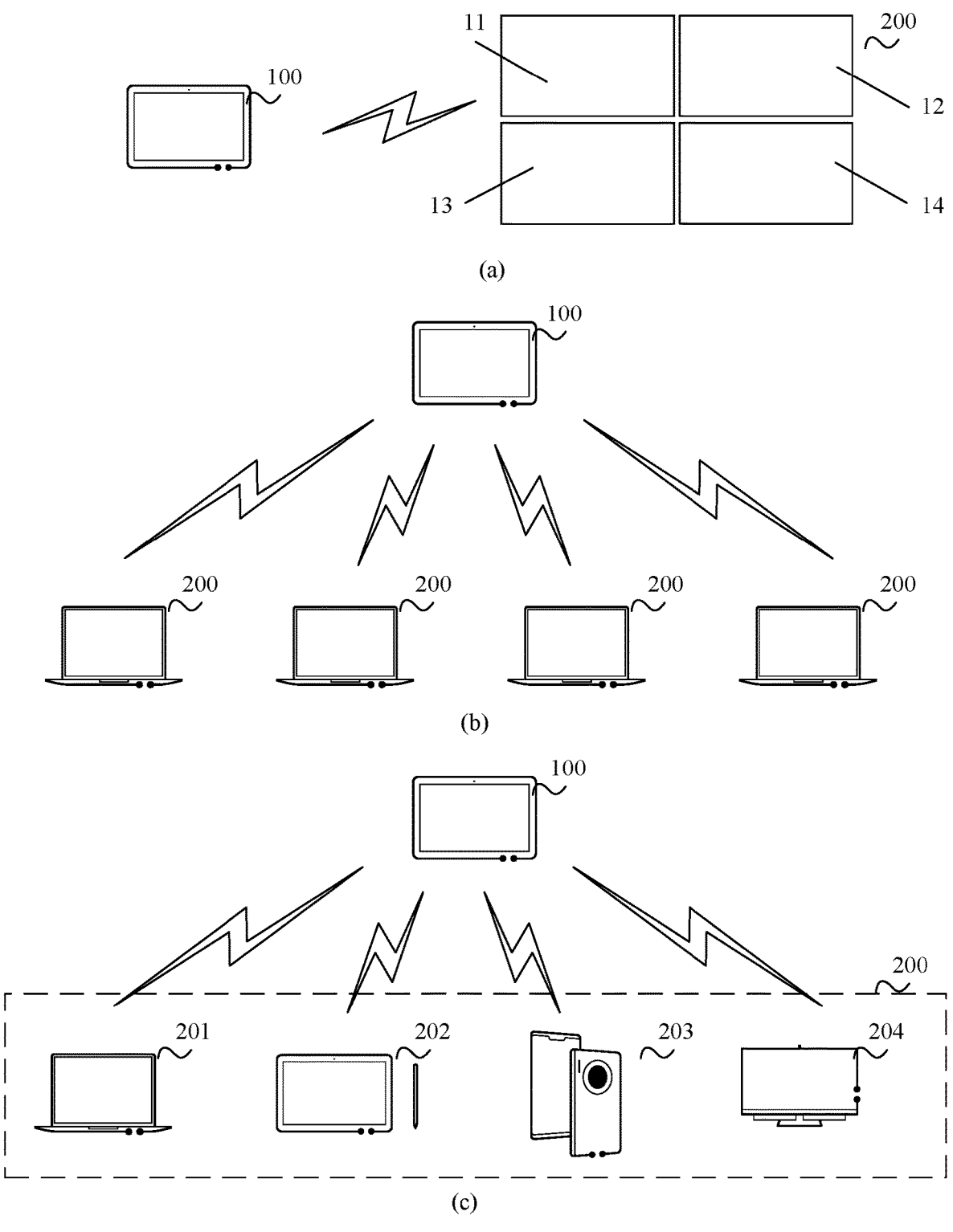
FIG. 2 is a schematic diagram of a communication system to which a display method is applied according to an embodiment of this application.

FIG. 2 is a schematic diagram of a communication system to which a display method is applied according to an embodiment of this application. As shown in FIG. 2, a communication connection is established between a first electronic device 100 and a second electronic device 200. For example, a wireless communication connection is established between the first electronic device 100 and the second electronic device 200. For example, the first electronic device 100 may send, through the wireless communication connection to the second electronic device 200, display content on the first electronic device 100 to the second electronic device 200 for display. Optionally, the first electronic device 100 is a main control end device, and the second electronic device 200 is a controlled end device.

The wireless communication connection may be established between the first electronic device 100 and the second electronic device 200 by using a wireless communication technology. The wireless communication technology includes but is not limited to at least one of the following: near field communication (near field communication, NFC), Bluetooth (Bluetooth, BT) (for example, conventional Bluetooth or Bluetooth low energy (Bluetooth low energy, BLE)), a wireless local area network (wireless local area network, WLAN) (such as a wireless fidelity (wireless fidelity, Wi-Fi) network), Zigbee (Zigbee), frequency modulation (frequency modulation, FM), and infrared (infrared, IR).

In some embodiments, both the first electronic device 100 and the second electronic device 200 support a proximity discovery function. For example, both the first electronic device 100 and the second electronic device 200 can implement the proximity discovery function through NFC sensing. After the first electronic device 100 approaches the second electronic device 200, the first electronic device 100 and the second electronic device 200 can discover each other, then, a wireless communication connection such as a Wi-Fi peer-to-peer (peer to peer, P2P) connection or a Bluetooth connection is established.

In some embodiments, the wireless communication connection is established between the first electronic device 100 and the second electronic device 200 through a local area network. For example, both the first electronic device 100 and the second electronic device 200 are connected to a same router.

In some embodiments, the wireless communication connection is established between the first electronic device 100 and the second electronic device 200 through a cellular network, the Internet, or the like. For example, the second electronic device 200 accesses the Internet through a router, and the first electronic device 100 accesses the Internet through a cellular network. Further, the wireless communication connection is established between the first electronic device 100 and the second electronic device 200.

For example, the first electronic device 100 or the second electronic device 200 includes but is not limited to a smartphone, a tablet computer, a personal computer (personal computer, PC), a wearable device (such as a smartwatch or a smart band), a laptop computer (Laptop), a personal digital assistant (personal digital assistant, PDA), a vehicle-mounted device, a virtual reality (virtual reality, VR) device, an augmented reality (augmented reality, AR) device, and an artificial intelligence (artificial intelligence, AI) device. An operating system installed on the first electronic device 100 or the second electronic device 200 includes but is not limited to iOS®, Android®, Harmony®, Windows®, Linux®, or another operating system. Alternatively, the first electronic device 100 or the second electronic device 200 may not be installed with an operating system. In some embodiments, the first electronic device 100 or the second electronic device 200 may be a fixed device, or may be a portable device. A specific type of the first electronic device 100 or the second electronic device 200, whether an operating system is installed, or a type of an operating system when an operating system is installed is not limited in this application.

In some scenarios, as shown in (a) in FIG. 2, the second electronic device 200 is a splicing screen, and the splicing screen may be, for example, a display system including a display 11, a display 12, a display 13, and a display 14. After the displays of the second electronic device 200 are set, the first electronic device 100 sends display content to the displays of the second electronic device 200 for display, where an image obtained by combining the display content of the displays corresponds to an image displayed by the first electronic device 100. In some embodiments, the splicing screen may also be described as a splicing screen display system, where each display in the splicing screen display system may be used as one independent display device. For example, as shown in (a) in FIG. 2, a main control end device includes the first electronic device 100, and a controlled end device includes the display device 11, the display device 12, the display device 13, and the display device 14.

In some other scenarios, as shown in (b) and (c) in FIG. 2, there are a plurality of second electronic devices 200, and the plurality of second electronic devices 200 and the first electronic device 100 form a distributed display system. As shown in (b) in FIG. 2, device types of the plurality of second electronic devices 200 may be the same. Alternatively, as shown in (c) in FIG. 2, device types of the plurality of second electronic devices 200 may be different (where, for example, the second electronic devices 200 include a PC 201, a PAD 202, a mobile phone 203, and a large-screen device 204). After setting of the plurality of second electronic devices 200 is completed, the plurality of second electronic devices 200 can display some or all of display content of the first electronic device 100, and the display content of the plurality of second electronic devices 200 may be the same or different. Further, some or all of the plurality of second electronic devices 200 may be a splicing screen (not shown in (b) and (c) in FIG. 2). That is, in the distributed display scenario shown in (b) or (c) in FIG. 2, the second electronic device 200 may also include the splicing screen shown in (a) in FIG. 2.

It should be noted that the communication system provided in this embodiment of this application may include one main control end device and a plurality of controlled end devices. The controlled end devices may be displays in the splicing screen, or devices in the distributed display system, or include both displays in the splicing screen and devices in the distributed display system. In addition, the distributed display system may include or not include a splicing screen. When the distributed display system includes a splicing screen and a non-splicing screen (for example, a non-splicing screen device such as a mobile phone or a PAD), the controlled end device includes a display in the splicing screen and another non-splicing screen. That is, each controlled end device corresponds to one display configured to display display content corresponding to the main control end device, and the controlled end device includes an independent electronic device (such as the second electronic device 200 shown in (b) or (c) in FIG. 2) and/or a display device in the splicing screen display system. In this embodiment of this application, the "display of the controlled end device" is used to represent a display corresponding to a minimum unit of the display content of the main control end device. For example, as shown in (a) in FIG. 2, the display of the controlled end device is used to represent each sub-display included in the splicing screen. For another example, in the distributed display system shown in (b) in FIG. 2, the display of the controlled end device is used to represent a display that is of each second electronic device 200 and that is used to display image data sent by the main control end device. This is not described again below.

In addition, the display of the splicing screen may be formed by splicing a plurality of sub-displays, or the splicing screen indicates that a display region of the display includes a plurality of display sub-regions. The scenario of the distributed display system formed by the main control end device and the plurality of controlled end devices may be described as a distributed display scenario. This is not described again below.

Figure 3:
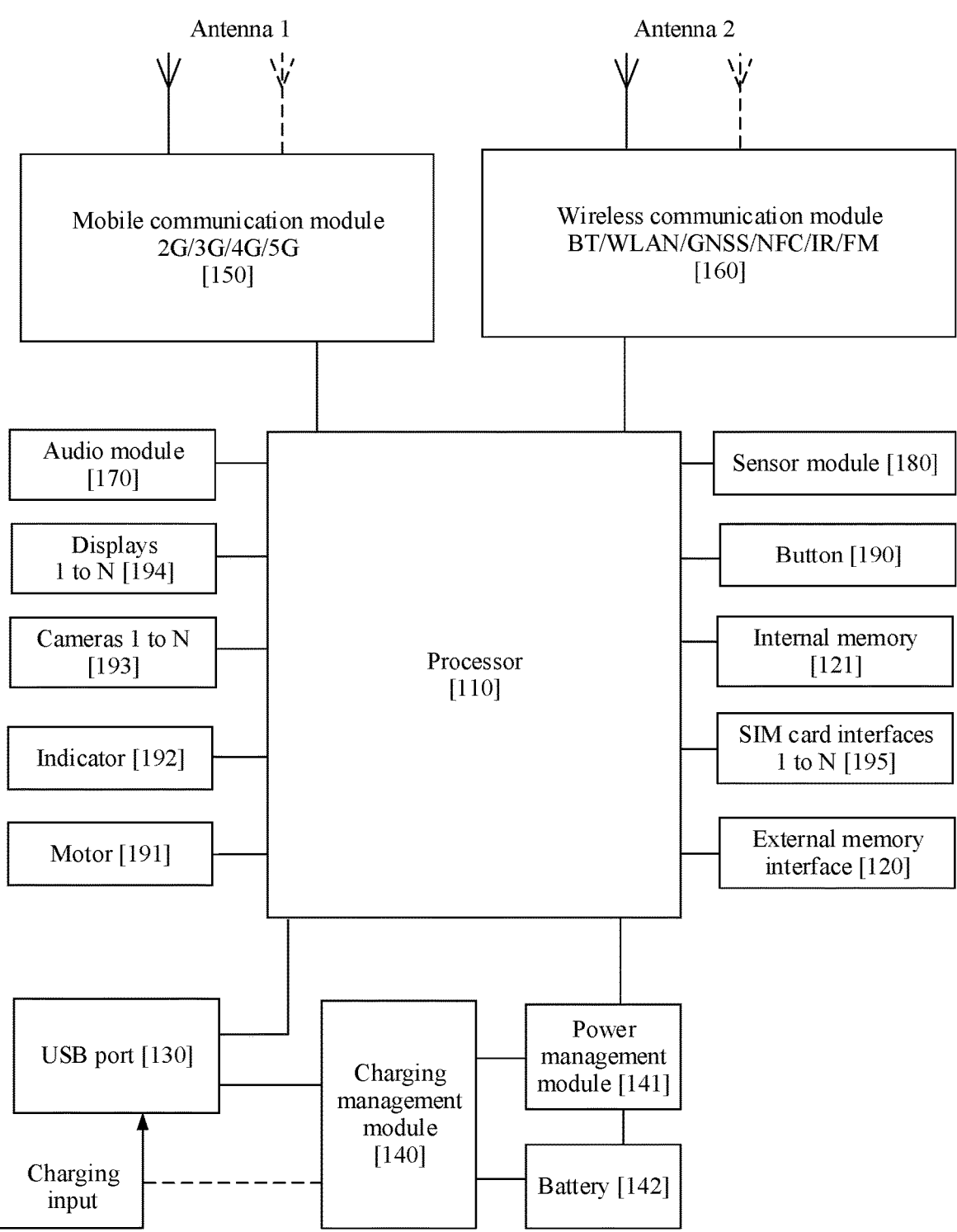
FIG. 3 is a schematic diagram of a hardware structure of an electronic device according to an embodiment of this application.

For example, FIG. 3 is a schematic diagram of a structure of the first electronic device 100 or the second electronic device 200.

The first electronic device 100 or the second electronic device 200 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a sensor module 180, a button 190, a motor 191, an indicator 192, a camera 193, a display 194, a subscriber identity module (subscriber identity module, SIM) card interface 195, and the like.

It may be understood that the structure shown in this embodiment of this application constitutes no specific limitation on the first electronic device 100 or the second electronic device 200. In some other embodiments of this application, the first electronic device 100 or the second electronic device 200 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronous serial bus, including a serial data line (serial data line, SDA) and a serial clock line (serial clock line, SCL). In some embodiments, the processor 110 may include a plurality of groups of I2C buses. The processor 110 may be separately coupled to a touch sensor, a charger, a flash, the camera 193, and the like through different I2C bus interfaces. For example, the processor 110 may be coupled to the touch sensor through the I2C interface, so that the processor 110 communicates with the touch sensor through the I2C bus interface, to implement a touch function of the first electronic device 100 or the second electronic device 200.

The MIPI interface may be used to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement an image shooting function of the first electronic device 100 or the second electronic device 200. The processor 110 communicates with the display 194 through the DSI interface, to implement a display function of the first electronic device 100 or the second electronic device 200.

The USB port 130 is a port that conforms to a USB standard specification, and may be specifically a mini USB port, a micro USB port, a USB type-C port, or the like. The USB port 130 may be used to connect to the charger to charge the first electronic device 100 or the second electronic device 200, or may be used to transmit data between the first electronic device 100 or the second electronic device 200 and a peripheral device, or may be used to connect to a headset for playing audio through the headset. The interface may be further used to connect to another electronic device such as an AR device.

It may be understood that an interface connection relationship between the modules illustrated in embodiments of this application is merely an example for description, and does not constitute a limitation on the structure of the first electronic device 100 or the second electronic device 200. In some other embodiments of this application, the first electronic device 100 or the second electronic device 200 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input through a wireless charging coil of the first electronic device 100 or the second electronic device 200. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the first electronic device 100 or the second electronic device 200 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the first electronic device 100 or the second electronic device 200 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the first electronic device 100 or the second electronic device 200. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules in the mobile communication module 150 may be disposed in the processor 110. In some embodiments, at least some function modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device, or displays an image or a video on the display 194. In some embodiments, the modem processor may be an independent component. In some other embodiments, the modem processor may be independent of the processor 110, and is disposed in a same device as the mobile communication module 150 or another function module.

The wireless communication module 160 may provide a wireless communication solution that is applied to the first electronic device 100 or the second electronic device 200 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the first electronic device 100 or the second electronic device 200 are coupled, and the antenna 2 and the wireless communication module 160 in the first electronic device 100 or the second electronic device 200 are coupled, so that the first electronic device 100 or the second electronic device 200 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Bei-Dou navigation satellite system (BeiDou navigation satellite system, BDS), a quasi-zenith satellite system (quasi-zenith satellite system, QZSS), and/or a satellite based augmentation system (satellite based augmentation system, SBAS).

The first electronic device 100 or the second electronic device 200 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the first electronic device 100 or the second electronic device 200 may include one or N displays 194, where N is a positive integer greater than 1.

In some embodiments, the second electronic device 200 may be a splicing screen, and a display of the second electronic device 200 is a display system including a display of each second electronic device 200. The display of each second electronic device is configured to display different display content, and after the different display content is spliced, a complete and ordered image can be formed.

The camera 193 is configured to capture a static image or a video. An optical image of an object is generated through a lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the first electronic device 100 or the second electronic device 200 may include one or N cameras 193, where N is a positive integer greater than 1.

The external memory interface 120 may be used to connect to an external storage card, for example, a micro SD card, to extend a storage capability of the first electronic device 100 or the second electronic device 200. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage region and a data storage region. The program storage region may store an operating system, an application required by at least one function (for example, a voice playing function or an image playing function), and the like. The data storage region may store data (such as audio data and an address book) created during use of the first electronic device 100 or the second electronic device 200, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs the instructions stored in the internal memory 121 and/or the instructions stored in the memory disposed in the processor, to perform various function applications and data processing of the first electronic device 100 or the second electronic device 200.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules in the audio module 170 are disposed in the processor 110. The first electronic device 100 or the second electronic device 200 may perform, for example, music playing or recording by using the audio module 170. The audio module 170 may include a speaker, a receiver, a microphone, a headset interface, an application processor, and the like to implement an audio function.

The sensor module 180 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

The pressure sensor is configured to sense a pressure signal, and can convert the pressure signal into an electrical signal. In some embodiments, the pressure sensor may be disposed in the display 194. There are many types of pressure sensors such as a resistive pressure sensor, an inductive pressure sensor, and a capacitive pressure sensor. The capacitive pressure sensor may include at least two parallel plates made of conductive materials. When a force is applied to the pressure sensor, capacitance between electrodes changes. The first electronic device 100 or the second electronic device 200 determines pressure intensity based on the change in the capacitance. When a touch operation is performed on the display, the first electronic device 100 or the second electronic device 200 detects intensity of the touch operation through the pressure sensor. The first electronic device 100 or the second electronic device 200 may also calculate a touch position based on a detection signal of the pressure sensor. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating an SMS message is performed.

The touch sensor is also referred to as a "touch component". The touch sensor may be disposed on the display 194, and the touch sensor and the display 194 constitute a touchscreen, which is also referred to as a "touch screen". The touch sensor is configured to detect a touch operation performed on or near the touch sensor. The touch sensor may transfer the detected touch operation to the application processor to determine a type of the touch event. The display 194 may provide a visual output related to the touch operation. In some other embodiments, the touch sensor may also be disposed on a surface of the first electronic device 100 or the second electronic device 200 at a location different from that of the display 194.

In some embodiments, the first electronic device 100 detects, by using the touch sensor, a touch operation performed by a user on the display, and performs projection configuration. The first electronic device 100 detects, by using the touch sensor, a display region selection operation performed by the user on the display, and determines a display region. If the first electronic device 100 detects, by using the touch sensor, a drag operation performed by the user on the display, and determines to drag a display identifier that is of the second electronic device 200 and that is displayed on the display of the first electronic device 100 to the display region, a correspondence between a display corresponding to the display identifier of the second electronic device 200 and the display region is established.

The button 190 includes a power button, a volume button, and the like. The button 190 may be a mechanical button, or may be a touch button. The first electronic device 100 or the second electronic device 200 may receive a button input, and generate a button signal input related to a user setting and function control of the first electronic device 100 or the second electronic device 200.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different regions of the display 194. Different application scenarios (for example, a time reminder, information receiving, an alarm clock, and a game) may also correspond to different vibration feedback effects. The touch vibration feedback effect may be further customized.

The indicator 192 may be an indicator, and may be configured to indicate a charging status and a power change, or may be configured to indicate a message, a missed call, a notification, and the like.

The SIM card interface 195 is used to connect to a SIM card. The SIM card may be inserted into the SIM card interface 195 or removed from the SIM card interface 195, to implement contact with or separation from the first electronic device 100 or the second electronic device 200. The first electronic device 100 or the second electronic device 200 may support one or N SIM card interfaces, where N is a positive integer greater than 1.

The following embodiments are described by using an example in which the first electronic device 100 is a main control end device and the second electronic device 200 is a controlled end device.

Figure 4:
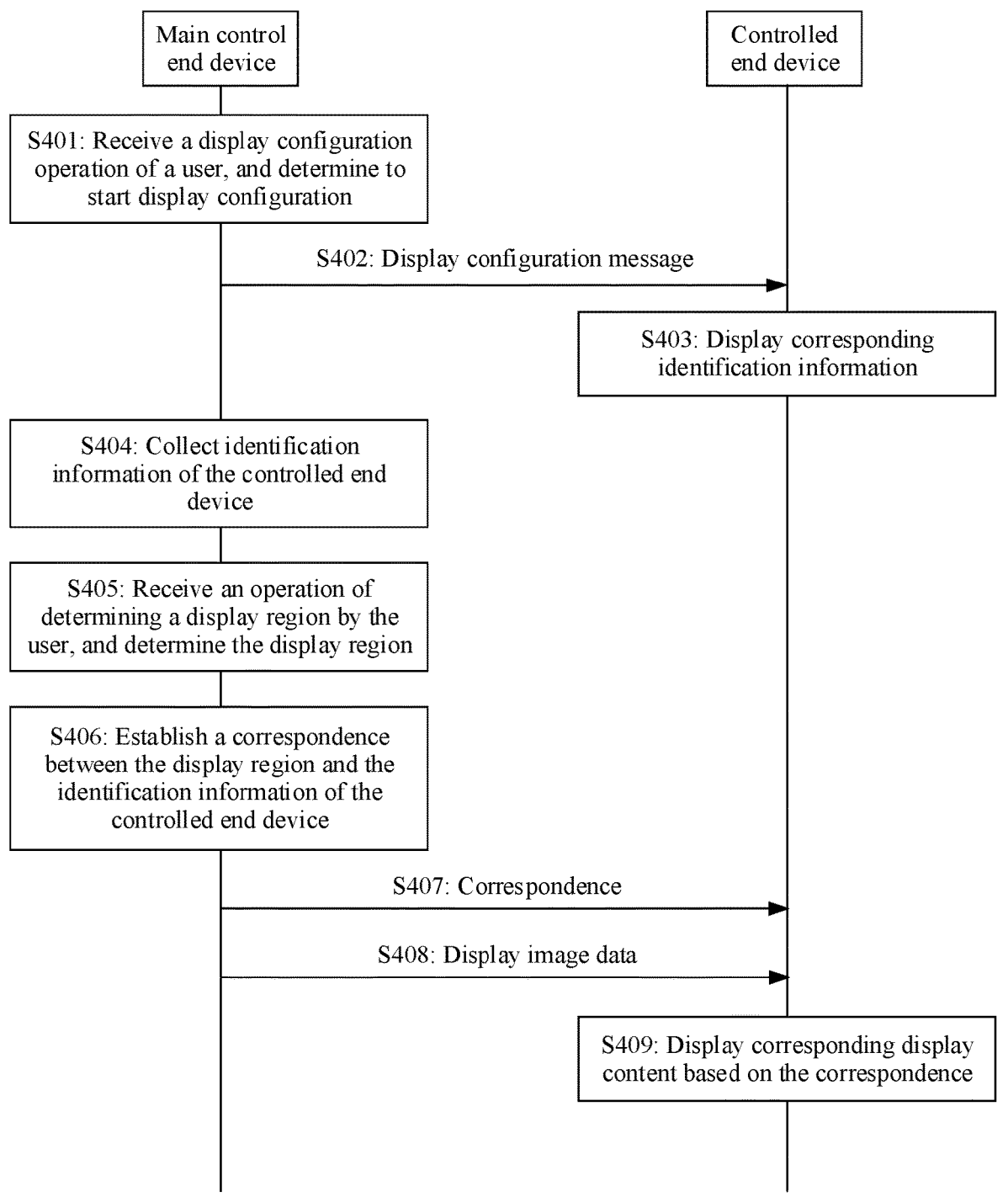
FIG. 4 is a flowchart 1 of a display method according to an embodiment of this application.

For example, FIG. 4 is a schematic diagram of a display method according to an embodiment of this application. As shown in FIG. 4, the method may include S401 to S409.

S401: A main control end device receives a display configuration operation of a user, and determines to start display configuration.

The display configuration operation includes, for example, a touch operation (for example, an operation of tapping a control for determining to start the display configuration) performed by the user on a display, a voice operation indicating the display configuration, an operation of inputting a display configuration command by using a physical button on the main control end device, and an operation of inputting a display configuration command by using a remote control.

In some embodiments, after receiving the display configuration operation, the main control end device determines that the display configuration needs to be started, that is, determines that a correspondence between a display region of a display of the main control end device and a controlled end device needs to be established, and the controlled end device displays display content of the main control end device.

Figure 5:
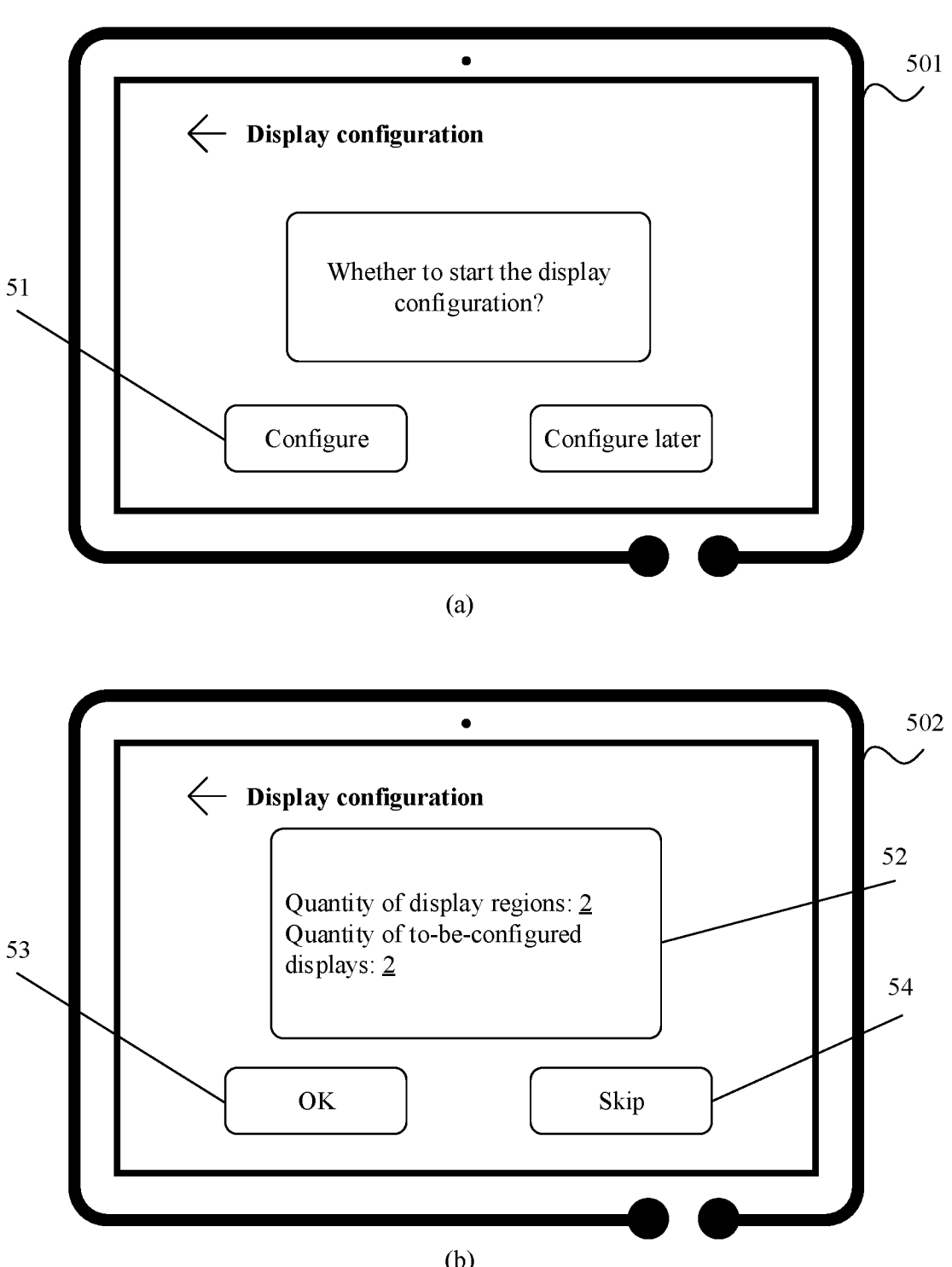
FIG. 5 is a schematic diagram 1 of an interface according to an embodiment of this application.

For example, as shown in (a) in FIG. 5, after detecting that the user performs a display setting operation, the main control end device displays an interface 501 for giving the user a prompt indicating whether to start the display configuration. After detecting an operation of tapping a control 51 by the user, the main control end device determines to start to perform the display configuration.

In some embodiments, after receiving the display configuration operation of the user, the main control end device may further display a quantity confirmation interface for confirming quantities of display regions and controlled end devices between which a correspondence is to be established, so that the main control end device can determine display regions of the correct quantity and the identification information of the controlled end device in a subsequent process of determining the display regions and collecting identification information of displays. The controlled end device includes an independent electronic device and/or an independent display device in a splicing screen display system (namely, each sub-display of a splicing screen).

For example, on an interface 502 shown in (b) in FIG. 5, the main control end device receives an input of the user, and determines the quantity of the display regions and a quantity of to-be-configured displays (namely, a quantity of the controlled end devices). As shown by a reference numeral 52, the main control end device determines, based on the input of the user, that the quantity of the display regions is 2 and the quantity of the to-be-configured displays is 2. Then, if the main control end device detects an operation of tapping an "OK" control 53 by the user, the main control end device determines that the user has determined the quantity of the display regions and the quantity of the controlled end devices. Alternatively, on an interface 502 shown in (b) in FIG. 5, if the main control end device detects an operation of tapping a "Skip" control 54 by the user, the main control end device determines that the user does not input or does not determine the quantity of the display regions and the quantity of the controlled end devices, and directly performs the following steps to automatically determine the quantity of the display regions and the quantity of the controlled end devices.

S402: The main control end device sends a display configuration message to the controlled end device.

In some embodiments, after determining to start configuring the display, the main control end device sends the display configuration message to the controlled end device, where the display configuration message is sent in a manner of a broadcast packet or a multicast packet. For example, the display configuration message may be sent in a BLE broadcast manner, a user datagram protocol (user datagram protocol, UDP) broadcast manner, a multicast manner, or the like. Correspondingly, after being started, the controlled end device starts message listening, and receives the display configuration message after obtaining, through listening, the display configuration message sent in a broadcast or multicast manner.

Figure 6:
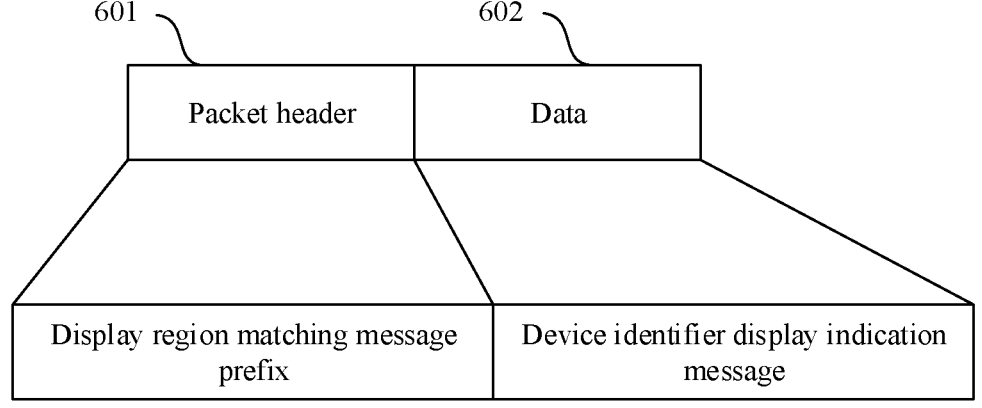
FIG. 6 is a schematic diagram 1 of a structure of a packet according to an embodiment of this application.

For example, FIG. 6 shows a structure of a packet including a packet header and data of the packet according to an embodiment of this application. As shown in FIG. 6, the packet is used to carry the display configuration message. For example, a packet header field 601 carries an identification digit of a display region matching message prefix, and the identification digit indicates that a message type corresponding to the current packet is a display configuration message, so as to trigger the controlled end device to perform display region matching. That is, the controlled end device can determine, based on the identification digit of the packet header, that the packet is a packet transmitted in the display region matching procedure, and then determine specific execution step content based on a data field of the packet. In some implementations, in the entire process of the embodiment shown in FIG. 4, packets transmitted between the main control end device and the controlled end device may have the same display region configuration message prefix. This is not described again below. A data field 602 carries a device identifier display indication message indicating the controlled end device to start a display configuration process and display identification information corresponding to each display. Optionally, the identification digit may be a prefix (for example, the identification digit of the display region matching message prefix carried in the packet header), a suffix, or a field located in another location of the packet.

In this way, the main control end device sends the display configuration message in the multicast or broadcast manner. This can effectively reduce signaling overheads.

In the following embodiments, a non-distributed display scenario in which the controlled end device is a display in the splicing screen, or a distributed display scenario in which the controlled end device is a plurality of non-splicing screen devices is used as an example to describe the display method in this embodiment of this application. It may be understood that the display method provided in this embodiment of this application may also be applied to the distributed display scenario including the splicing screen. Details are not described herein again.

S403: The controlled end device displays corresponding identification information.

In some embodiments, after the controlled end device receives the display configuration message, if the controlled end device determines to start the display configuration process, the controlled end device displays identification information corresponding to the controlled end device on a display. For example, if the controlled end device is a display device in the splicing screen display system, each controlled end device displays identification information corresponding to the controlled end device. For another example, if the controlled end devices are devices in the distributed display scenario, each controlled end device displays corresponding identification information on a display.

The identification information is unique identification information of the controlled end device, and indicates the controlled end device. For example, the identification information is a BLE address, an IP address, or the like of the controlled end device. Optionally, the controlled end device displays the identification information in one or more manners of a two-dimensional code, a bar code, an image, a character, and the like. Different controlled end devices have different identification information.

It should be noted that each display included in the splicing screen may be used as an independent display device, and has unique identification information corresponding to each device. Therefore, when the display in the splicing screen is used as the controlled end device, the display can independently receive the display configuration message, and display corresponding identification information based on the display configuration message.

Figure 7:
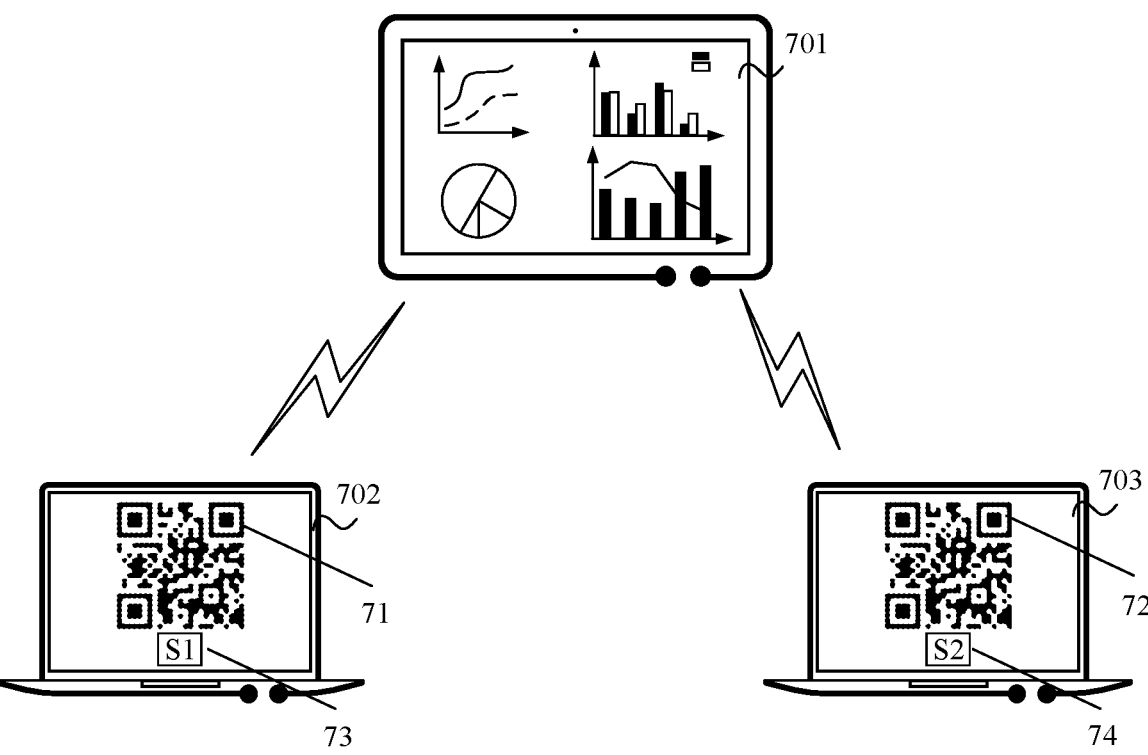
FIG. 7 is a schematic diagram 2 of an interface according to an embodiment of this application.

For example, as shown in FIG. 7, in this embodiment of this application, a distributed display scenario including one main control end device (for example, a main control end device 701) and two controlled end devices (for example, a controlled end device 702 and a controlled end device 703) is used as an example to describe the display configuration procedure. After receiving the display configuration message, the controlled end device 702 determines to display a two-dimensional code image 71 corresponding to the controlled end device 702, where the two-dimensional code image 71 corresponds to identification information of the controlled end device 702. After receiving the display configuration message, the controlled end device 703 determines to display a two-dimensional code image 72 corresponding to the controlled end device 703, where the two-dimensional code image 72 corresponds to identification information of the controlled end device 703.

Optionally, when displaying identification information, a controlled end device may further display a controlled end device identifier that can be directly read by the user, so that the user can determine, based on the controlled end device identifier, a specific controlled end device corresponding to the currently displayed identification information. As shown in FIG. 7, the controlled end device 702 displays the two-dimensional code image 72, but the user cannot directly read identification information represented by the two-dimensional code image 72 with human eyes. Therefore, the controlled end device 702 displays a controlled end device identifier 73, and the user can determine that the controlled end device 702 is S1 based on the controlled end device identifier 73. Similarly, as shown in FIG. 7, the controlled end device 703 displays a controlled end device identifier 74, and the user can determine that the controlled end device 703 is S2 based on the controlled end device identifier 74.

S404: The main control end device collects the identification information of the controlled end device.

In some embodiments, the main control end device invokes a camera to scan a display of the controlled end device, and obtain the identification information of the controlled end device.

For example, as shown in FIG. 7, the main control end device 701 invokes a camera to scan displays of the controlled end device 702 and the controlled end device 703, obtain two-dimensional code image data of the two-dimensional code image 71 and the two-dimensional code image 72, parse the two-dimensional code image data, and determine identification information corresponding to the two controlled end devices. Optionally, as shown in FIG. 7, after sending the display configuration message to the controlled end device in step S402, the main control end device 701 actively invokes the camera to scan the identification information displayed on the display of the controlled end device. Alternatively, the user holds the main control end device 701 to scan the identification information displayed on the display of the controlled end device. In addition, the main control end device 701 may scan the identification information displayed on the displays of all the controlled end devices at a time. Alternatively, the main control end device 701 scans each two-dimensional code image one by one to obtain the identification information displayed on the displays of all the controlled end devices.

S405: The main control end device receives an operation of determining a display region by the user, and determines the display region.

The operation of determining the display region by the user includes, for example, a touch operation performed by the user on the display of the main control end device, for example, an operation of dragging to change a size or a location of a display region selection box, or an operation of freely determining a display region.

In some embodiments, the main control end device detects the operation of determining the display region by the user on the display, and determines the display region based on the user operation. There are one or more display regions.

Figure 8:
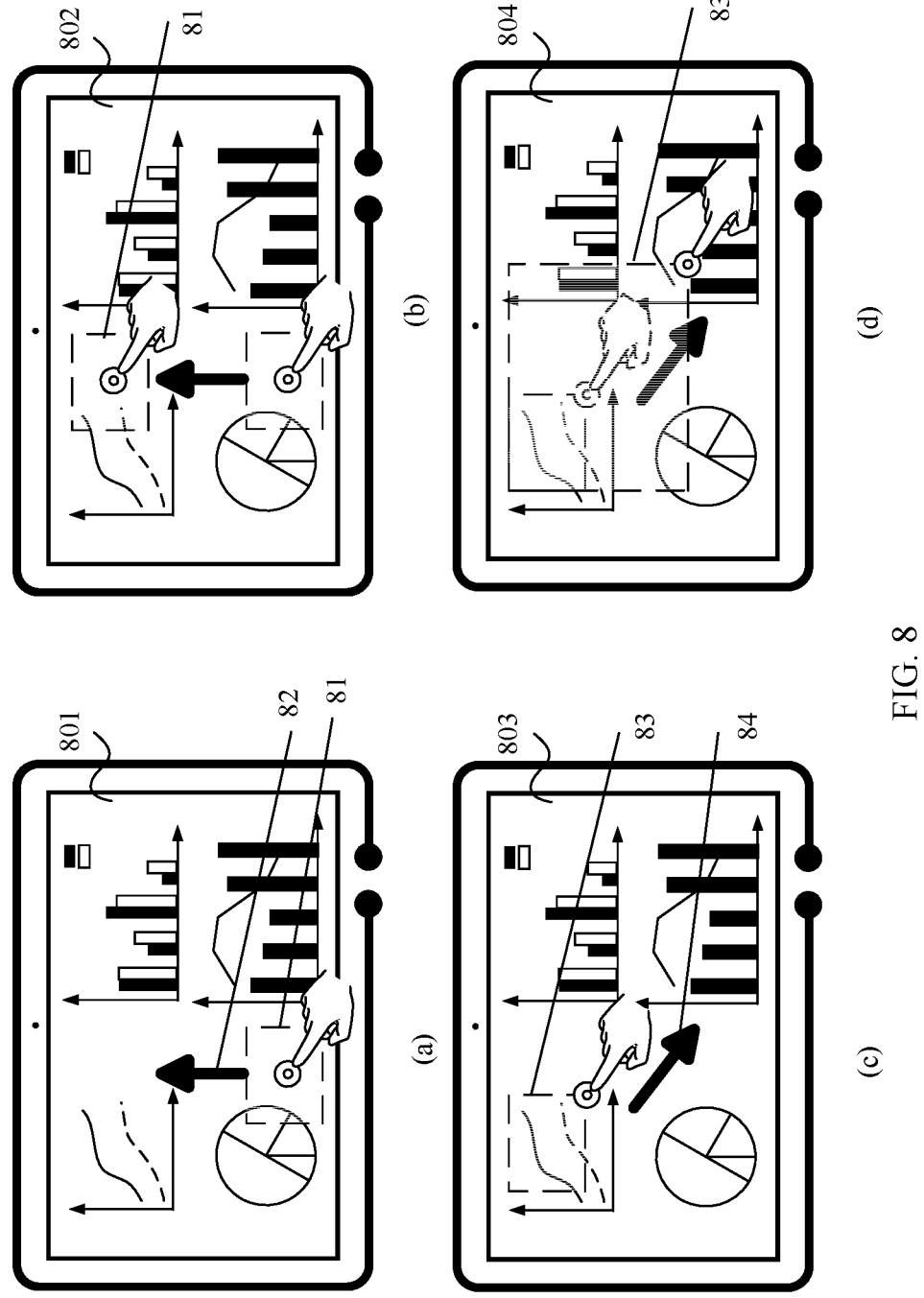
FIG. 8 is a schematic diagram 3 of an interface according to an embodiment of this application.

For example, on an interface 801 shown in (a) in FIG. 8, the main control end device displays a display region selection box 81. The display region selection box 81 is a closed box, and may be a movable control. In response to an operation performed by the user on the display region selection box 81, a size and a location of the display region selection box 81 are changed, so that the user can determine a size and a location of the selected display region. For example, if the main control end device detects an operation that the user touches and holds the display region selection box 81 and slides in a direction shown by an arrow 82, the main control end device moves the location of the display region selection box 81 in the direction shown by the arrow 82. On an interface 802 shown in (b) in FIG. 8, if the main control end device detects that the user stops the operation of touching and holding and sliding, the main control end device stops moving the display region selection box 81, and determines that the user moves the display region selection box 81 from the location shown on the interface 801 to a location shown on the interface 802. For another example, on an interface 803 shown in (c) in FIG. 8, if the main control end device displays a display region selection box 83, and detects an operation performed by the user on an edge of the selection box, the main control end device determines to change a size of a corresponding display region. As shown on the interface 803, if the main control end device detects an operation that the user touches and holds a lower right corner location of the display region selection box 83 and slides along a direction shown by an arrow 84, the main control end device enlarges the display region selection box 83 along the direction shown by the arrow 84. On an interface 804 shown in (d) in FIG. 8, if the main control end device detects that the user stops the operation of touching and holding and sliding, the main control end device stops enlarging the display region selection box 83, and determines that the user enlarges the display region selection box 83 from a size shown on the interface 803 to a size shown on the interface 804.

Figure 9:
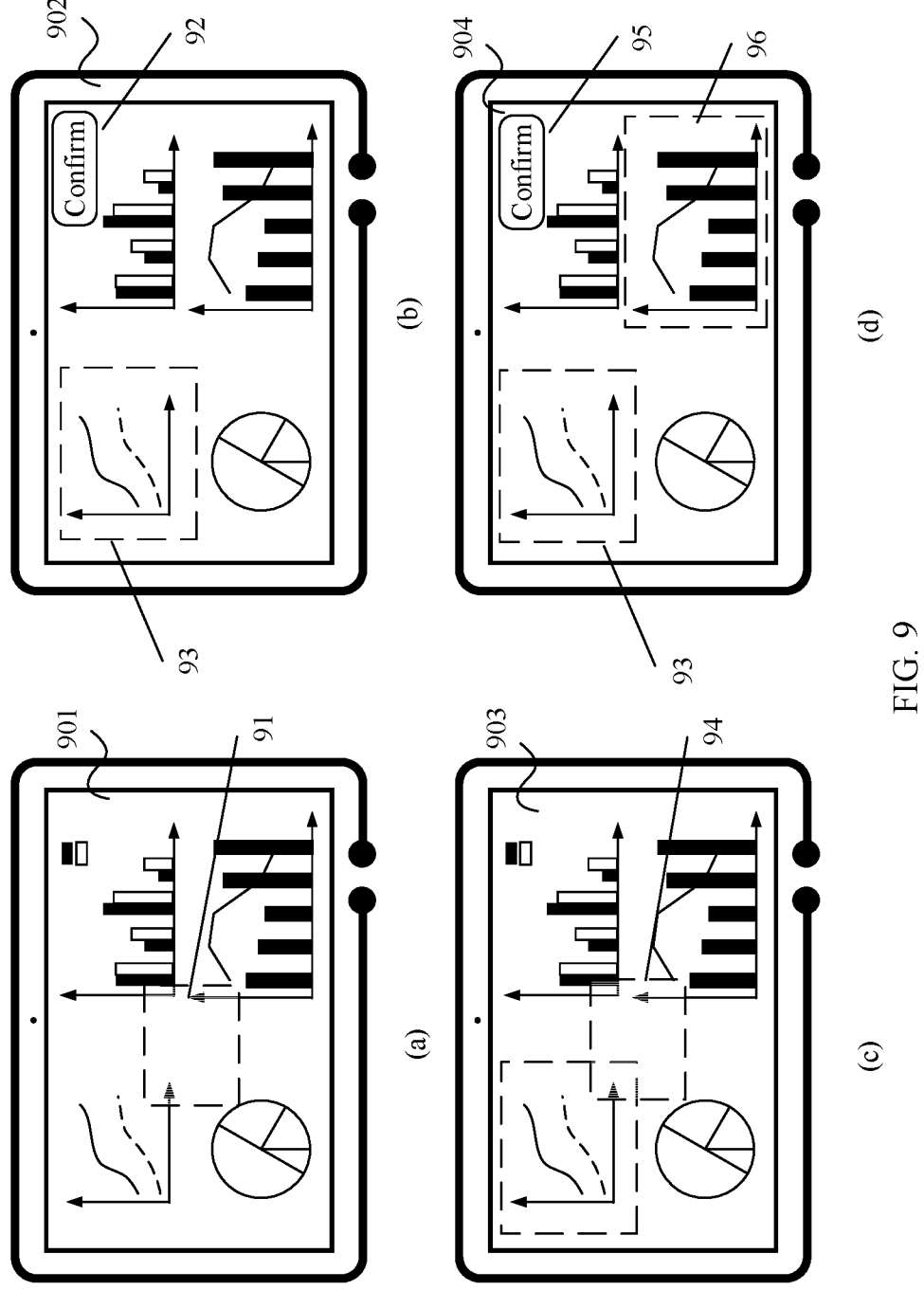
FIG. 9 is a schematic diagram 4 of an interface according to an embodiment of this application.

For example, based on the method for changing the location and the size of the display region shown in FIG. 8, on an interface 901 shown in (a) in FIG. 9, the main control end device displays a display region selection box 91. In response to an operation performed by the user on the display region selection box 91, a size and a location of the display region selection box 91 are determined, to determine a corresponding display region. On an interface 902 shown in (b) in FIG. 9, if the main control end device detects an operation of tapping a "Confirm" control 92 by the user, the main control end device determines that the user has completed selection of the current display region. For example, the display region in a display region selection box 93 is the display region determined by the user.

It is assumed that the main control end device has obtained a quantity of the display regions as 2 in step S401; or after collecting the identification information of the display in step S404, the main control end device determines that a quantity of the display regions is 2 based on an amount of identification information (where it is assumed that the amount of identification information is equal to the quantity of the display regions). In this case, on an interface 903 shown in (c) in FIG. 9, after determining a display region based on the quantity of the display regions, the main control end device displays a display region selection box 94 for determining another display region. On an interface 904 shown in (d) in FIG. 9, if the main control end device detects an operation of tapping a "Confirm" control 95 by the user, the main control end device determines that the user has completed selection of the current display region. For example, the display region in a display region selection box 96 is the display region determined by the user. Then, the main control end device confirms, based on the quantity of the display regions, that selection of all the display regions is completed.

In some embodiments, the main control end device determines location information of the display region after detecting an operation of confirming the display region by the user. In the following step S409, the controlled end device can display, based on the location information of the display region and the correspondence, display content corresponding to the location information. The location information of the display region includes, for example, pixel coordinates corresponding to the display region, pixel coordinates of a pixel at an edge of the display region, or pixel coordinates of all pixels in the display region.

In some embodiments, a control for determining that selection of the display region is completed is preset, and the control indicates that selection of all the display regions is completed. Even if the main control end device does not obtain the quantity of the display regions in advance, after detecting an operation of tapping the control by the user, the main control end device may also determine that the user has completed selection of all the display regions.

In some embodiments, the main control end device may not display the display region selection box 91 shown on the interface 901 shown in (a) in FIG. 9, and directly detect a closed graphic gesture operation (namely, an operation of drawing a closed track by the user) performed by the user on the display. In response to the closed graphic gesture operation of the user, a display region in a closed graphic region is determined as a display region for which a correspondence with the controlled end device is to be established. Further, after detecting the closed graphic gesture operation, the main control end device automatically performs smooth processing on a corresponding closed graphic, and determines the corresponding display region.

In some embodiments, in step S401, the main control end device receives the quantity of the display regions input by the user, or the main control end device determines a quantity of controlled end devices based on the identification information of the controlled end device collected in step S404, and correspondingly determines the quantity of the display regions that is the same as the quantity of the controlled end devices. Then, the main control end device directly performs even division on an entire display region of the current display based on the quantity of the display regions, and automatically divides the display region. That is, in step S405, the display region is directly determined without receiving the operation of determining the display region by the user.

It should be noted that a sequence of performing steps S402 to S404 and step S405 by the main control end device is not limited in this embodiment of this application. For example, after receiving the display configuration operation of the user, the main control end device first sends the display configuration message to the controlled end device, collects the identification information after the controlled end device displays the corresponding identification information, and then receives the operation of determining the display region by the user (that is, steps S402 to S404 are first performed, and then step S405 is performed). Alternatively, after receiving the display configuration operation of the user, the main control end device first receives the operation of determining the display region by the user to determine the display region, and then sends the display configuration message to the controlled end device, so as to collect the identification information of the controlled end device (that is, step S405 is first performed, and then steps S402 to S404 are performed). Alternatively, after receiving the display configuration operation of the user, when the display configuration message is sent to the controlled end device, the main control end device receives the operation of determining the display region by the user (that is, steps S402 to S402 and step S405 are performed in parallel).

S406: The main control end device establishes a correspondence between the display region and the identification information of the controlled end device.

In some embodiments, the main control end device establishes the correspondence between the display region and the identification information of the controlled end device (that is, establishes the correspondence between the display region and the controlled end device) in response to an operation of establishing the correspondence by the user. After the correspondence is established, in the following step S409, the controlled end device may display, based on the correspondence, display content in the display region that is of the main control end device and that has the correspondence.

In some embodiments, the main control end device displays a controlled end device identifier, and detects an operation performed by the user on the controlled end device identifier, for example, detects an operation of dragging the controlled end device identifier to the display region by the user, a correspondence between the display region and identification information of a controlled end device corresponding to the controlled end device identifier is established. The controlled end device identifier displayed on the main control end device is an identifier that can be identified by the user and can be used to determine the corresponding controlled end device, for example, a number of the controlled end device and/or an icon of the controlled end device. Optionally, after detecting an operation of touching and holding or tapping the controlled end device identifier by the user, the main control end device changes the controlled end device identifier from an unselected state to a selected state. Afterward, when an operation of touching and holding or tapping the display region by the user is detected, the selected controlled end device identifier is displayed on the display region, and a correspondence is established.

Figure 10:
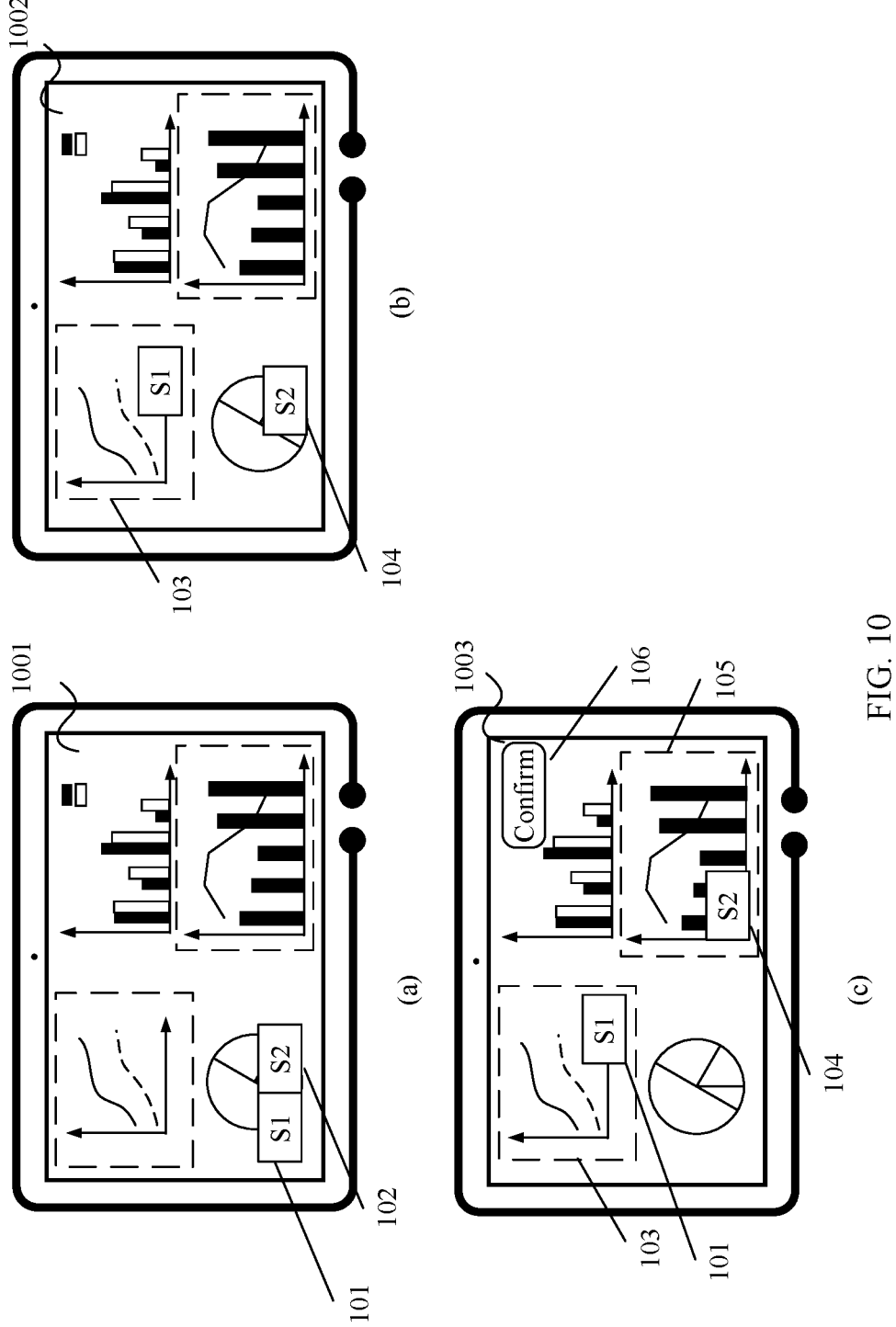
FIG. 10 is a schematic diagram 5 of an interface according to an embodiment of this application.

For example, on an interface 1001 shown in (a) in FIG. 10, the main control end device displays controlled end device identifiers. For example, a controlled end device identifier indicated by a reference numeral 101 is S1. As shown in FIG. 7, the controlled end device identifier 73 displayed by the controlled end device 702 is also S1. In this case, the user may determine that the controlled end device identifier S1 indicated by the reference numeral 101 corresponds to the controlled end device 702. Similarly, a controlled end device identifier S2 indicated by a reference numeral 102 displayed on the interface 1001 shown in (a) in FIG. 10 corresponds to the controlled end device 703 shown in FIG. 7. After detecting an operation of dragging (or touching and holding and then dragging) the controlled end device identifier S1 indicated by the reference numeral 101 by the user, the main control end device determines that a correspondence with the controlled end device 702 shown in FIG. 7 needs to be established. On an interface 1002 shown in (b) in FIG. 10, if the main control end device detects an operation of dragging the controlled end device identifier S1 to a display region shown in a dashed-line box 103 by the user, a correspondence between the display region shown in the dashed-line box 103 and the controlled end device 702 corresponding to the controlled end device identifier S1 is established.

Then, on the interface 1002 shown in (b) in FIG. 10, after detecting an operation of dragging (or touching and holding and then dragging) the controlled end device identifier S2 indicated by the reference numeral 104 by the user, the main control end device determines that a correspondence with the controlled end device 703 shown in FIG. 7 needs to be established. On an interface 1003 shown in (c) in FIG. 10, if the main control end device detects that the user drags the controlled end device identifier S2 to a display region shown in a dashed-line box 105, a correspondence between the display region shown in the dashed-line box 105 and the controlled end device 703 corresponding to the controlled end device identifier S2 is established.

Alternatively, after detecting that the operation of dragging (or touching and holding and then dragging) is completed, the main control end device does not establish the correspondence temporarily. Instead, on the interface 1003 shown in (c) in FIG. 10, after detecting an operation of tapping a "Confirm" control 106 by the user, if the main control end device confirms that the user has completed confirmation of all correspondences, and the correspondences between all the display regions and the identification information of the corresponding controlled end devices are established. The controlled end device identifier may be the number, a name, the icon, or the like of the controlled end device.

In some embodiments, in step S404, after collecting the identification information of the controlled end device, the main control end device displays the controlled end device identifier, where the identifier is a movable control. After detecting an operation performed by the user on the controlled end device identifier, the main control end device moves, rotates, enlarges, and reduces the controlled end device identifier correspondingly, and directly establishes a correspondence between a display region covered by the controlled end device identifier and the controlled end device corresponding to the controlled end device identifier. That is, the main control end device does not need to perform step S405.

Figure 11:
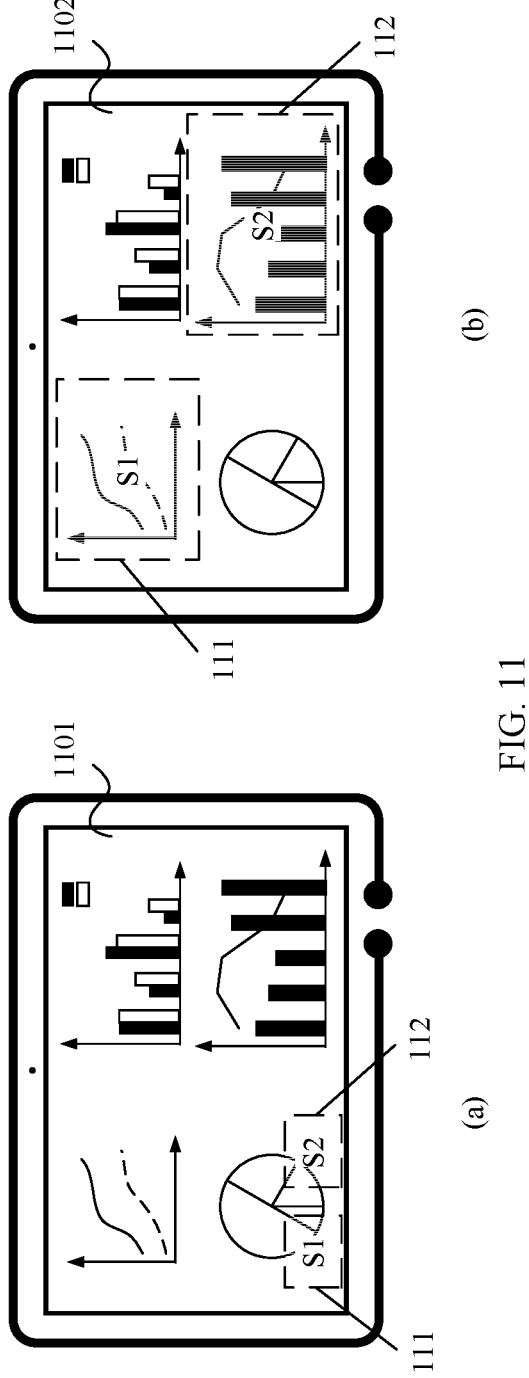
FIG. 11 is a schematic diagram 6 of an interface according to an embodiment of this application.

For example, on an interface 1101 shown in (a) in FIG. 11, after collecting the identification information of the controlled end device, the main control end device displays an identifier 111 corresponding to the controlled end device S1 and an identifier 112 corresponding to the controlled end device S2. After detecting an operation of moving display locations of the identifier 111 and the identifier 112 and enlarging display sizes of the identifier 111 and the identifier 112 by the user, the main control end device displays an interface 1102 shown in (b) in FIG. 11. As shown on the interface 1102, the identifier 111 and the identifier 112 are displayed with current display locations and current display sizes. Then, the main control end device establishes a correspondence between a display region corresponding to the display location and the display size shown by the identifier 111 in the interface 1102 and the controlled end device S1, and establishes a correspondence between a display region corresponding to the display location and the display size shown by the identifier 112 in the interface 1102 and the controlled end device S2.

In some embodiments, it is assumed that in the distributed display scenario, device types of the controlled end devices are different. In this case, the main control end device may display an icon (for example, a product diagram or a schematic diagram of a cartoon of the controlled end device) indicating the device type. The user may intuitively learn, based on the icon, a controlled end device corresponding to the icon, and then the user may directly determine, based on the icon, a controlled end device to which a correspondence is to be established, without further confirming a controlled end device identifier displayed by the controlled end device. Further, based on this scenario, the controlled end device may not need to display the controlled end device identifier. For example, as shown in FIG. 7, the controlled end device 702 does not need to display the controlled end device identifier 73, and the controlled end device 703 does not need to display the controlled end device identifier 74. In the current scenario, the identification information of the controlled end device may further include device type information of the controlled end device, so that the main control end device can determine a corresponding device icon based on the identification information.

For example, it is assumed that in the distributed display scenario, the controlled end device includes a mobile phone and a PAD. On an interface 1201 shown in (a) in FIG. 12, the main control end device displays a mobile phone icon 121 and a PAD icon 122. Therefore, the user can intuitively determine, based on an icon, a controlled end device corresponding to the icon, and then directly drag the icon to a display region to establish a correspondence. For example, on an interface 1202 shown in (b) in FIG. 12, if the main control end device detects an operation of dragging the mobile phone icon 121 to a display region 123 by the user, a correspondence between the display region 123 and the mobile phone is established. For another example, on the interface 1202 shown in (b) in FIG. 12, if the main control end device detects an operation of dragging the PAD icon 122 to a display region 124 by the user, a correspondence between the display region 124 and the PAD is established.

Figure 12:
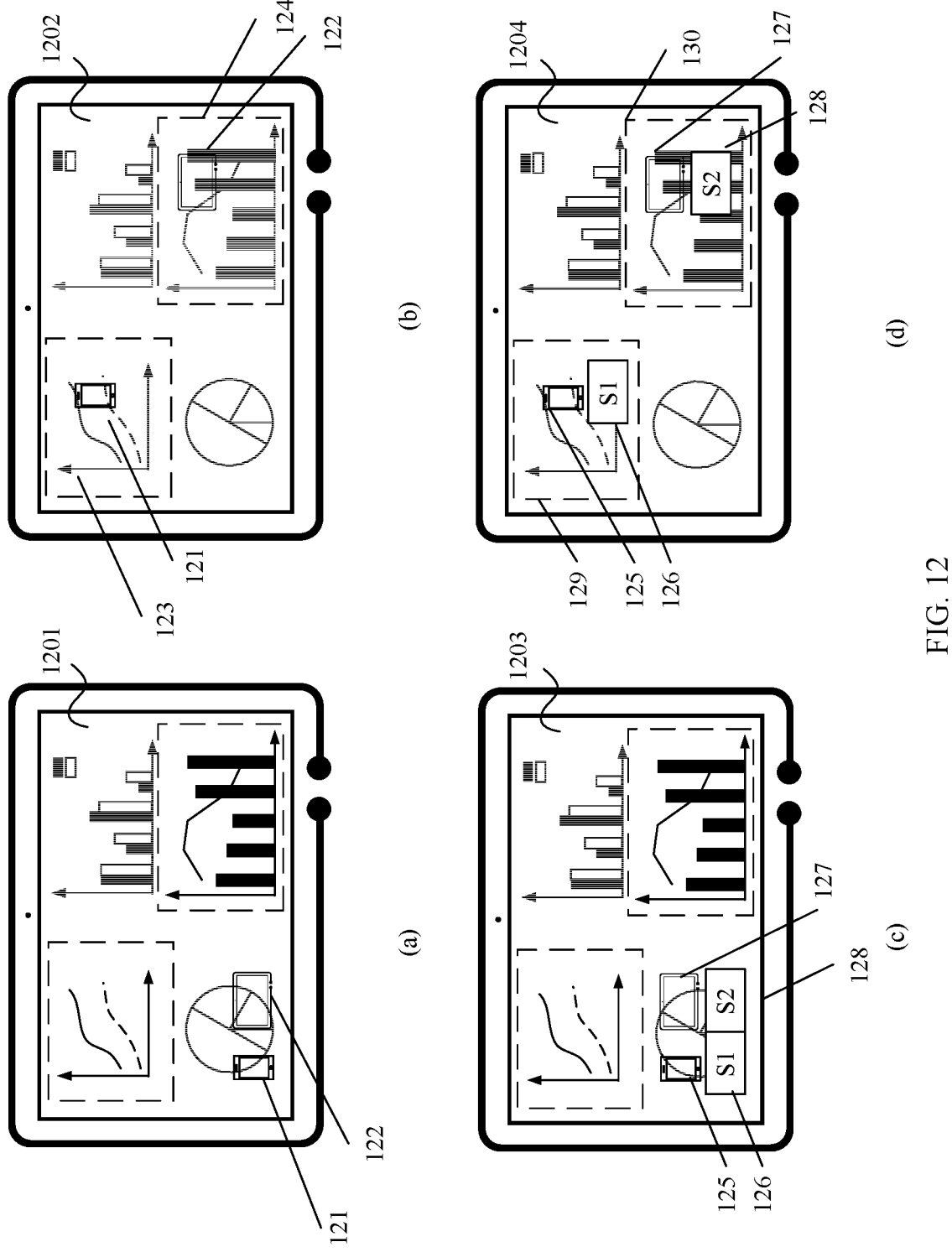
FIG. 12 is a schematic diagram 7 of an interface according to an embodiment of this application.

Alternatively, on an interface 1203 shown in (c) in FIG. 12, the main control end device displays a mobile phone icon 125 and a mobile phone identifier 126, and displays a PAD icon 127 and a PAD identifier 128. If the main control end device detects an operation of dragging an icon or an identifier to a display region by the user after the user touches and holds the icon or the identifier, a correspondence between the display region and a controlled end device corresponding to the icon or the identifier is established. In this way, the user can determine, in a double confirmation manner, a controlled end device to which a correspondence is to be established, so as to ensure correctness of establishing the correspondence and increase interest. For example, if on the interface 1203 shown in (c) in FIG. 12, the main control end device detects an operation of dragging the mobile phone icon 125 by the user after the user touches and holds the mobile phone icon 125, and on an interface 1204 shown in (d) in FIG. 12, determines that the user drags the mobile phone icon 125 to a display region 129, the mobile phone icon 125 and the mobile phone identifier 126 are displayed at corresponding locations in the display region 129, and a correspondence between the display region 129 and the mobile phone is established. For another example, if on the interface 1203 shown in (c) in FIG. 12, the main control end device detects an operation of dragging the PAD identifier 128 by the user after the user touches and holds the PAD identifier 128, and on the interface 1204 shown in (d) in FIG. 12, determines that the user drags the PAD identifier 128 to a display region 130, the PAD icon 127 and the PAD identifier 128 are displayed at corresponding locations in the display region 130, and a correspondence between the display region 130 and the PAD is established. In the process of the drag operation of the user, the main control end device displays a drag location change process of the dragged icon or identifier, or displays a drag location change process of both the icon and the identifier.

Figure 13:
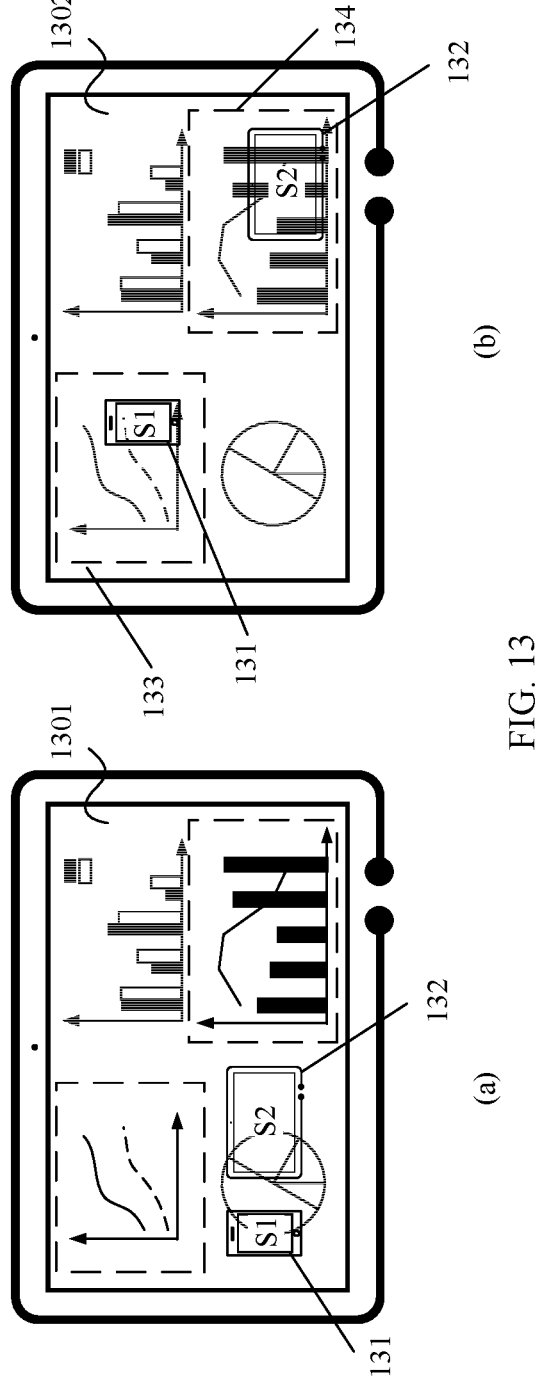
FIG. 13 is a schematic diagram 8 of an interface according to an embodiment of this application.

Alternatively, on an interface 1301 shown in (a) in FIG. 13, the main control end device displays a controlled end device identifier in a device icon. For example, as shown by a reference numeral 131, a mobile phone identifier is displayed in a mobile phone icon. For another example, as shown by a reference numeral 132, a PAD identifier is displayed in a PAD icon. Then, if, after detecting an operation of dragging content shown by the reference numeral 131 by the user after the user touches and holds the content, the main control end device displays an interface 1302 shown in (b) in FIG. 13, a correspondence between a mobile phone corresponding to the content shown by the reference numeral 131 and a display region 133 is established. If, after detecting an operation of dragging content shown by the reference numeral 132 by the user after the user touches and holds the content, the main control end device displays the interface 1302 shown in (b) in FIG. 13, a correspondence between a PAD corresponding to the content shown by the reference numeral 132 and a display region 134 is established.

It should be noted that, in a scenario in which some device types of the controlled end devices are the same, the methods shown in (b) in FIG. 12 and FIG. 13 may also be used, and a device icon and an identifier are displayed at the same time, so that the user distinguishes controlled end devices of the same device type.

In some embodiments, in the foregoing step S403, after receiving the display configuration message, the controlled end device may further directly send the corresponding identification information to the main control end device. That is, in step S403, the controlled end device does not need to display the corresponding identification information. Correspondingly, the main control end device can receive the identification information of the controlled end device in step S404. In this case, in step S406, the main control end device may determine to display a device icon corresponding to the controlled end device based on the identification information (where the identification information includes device type information of the main control end device). This helps avoid a problem that the user cannot determine a correspondence because an identifier corresponding to the controlled end device cannot be determined.

In some embodiments, in a display scenario including the splicing screen, the main control end device needs to determine a location relationship between displays in the splicing screen, so that the splicing screen can display a complete and ordered image. For example, in a process of collecting identification information of controlled end displays, the main control end device can determine a location relationship between the displays. Then, when the main control end device displays display identifiers, the display identifiers are displayed based on the location relationship. In this way, the user can determine the location relationship of the displays based on a spatial location relationship of the display identifiers. That is, the main control end device displays the spatial location relationship of the display identifiers (for example, display by using a display identifier map), where each display identifier location corresponds to a location of each display.

For example, it is assumed that the splicing screen includes two displays, and the two displays are spliced left and right to form the splicing screen, that is, two display devices are spliced left and right to form a splicing screen display system. In this case, on the interface 1001 shown in (a) in FIG. 10, the main control end device may display the controlled end device (namely, the display device) identifiers in a manner shown on the interface 1001, and the user can directly determine a location relationship of the display devices in the splicing screen based on a location relationship of the controlled end device identifiers. This simplifies the difficulty of establishing a correspondence. For another example, a splicing screen 1401 shown in (a) in FIG. 14 includes four display devices respectively displaying respective identification information (for example, two-dimensional code images). Then, in a process of scanning the two-dimensional code image, the main control end device can determine that a display device 141 is an upper left display device in a display of the splicing screen 1401, a display device 142 is an upper right display in the display of the splicing screen 1401, a display device 143 is a lower left display device in the display of the splicing screen 1401, and a display device 144 is a lower right display device in the display of the splicing screen 1401. In this case, on an interface 1402 shown in (b) in FIG. 14, the main control end device displays a display device identifier map shown by a reference numeral 145, where a location relationship between S1, S2, S3, and S4 corresponds to a location relationship between corresponding display devices 141 to 144 in the splicing screen 1401. Based on this, when there are a large quantity of sub-displays of the splicing screen, the user can also quickly determine, based on the spatial location relationship between the display identifiers, a location relationship between corresponding display devices in an actual scenario, so as to quickly and accurately establish a correspondence.

In some embodiments, there is a one-to-one correspondence between display devices in the splicing screen display system and display regions of the main control end device, and a quantity of the display regions is equal to a quantity of the display devices. That is, each display device can display a part of display content of the main control end device, and display content of all the display devices forms the complete and ordered display content of the main control end device. After obtaining a spatial location relationship (for example, the scenario shown in FIG. 14) of the display devices (namely, the controlled end devices) in the splicing screen display system, the main control end device can directly divide a corresponding display region based on the spatial location relationship of the display devices. In this case, the main control end device may not need to perform foregoing step S405. Specifically, the main control end device directly determines a quantity of corresponding display devices based on an amount of received identification information, so that an entire display region corresponding to the display of the main control end device may be directly evenly divided, to obtain display regions to which a correspondence is to be established. Then, the main control end device may determine a corresponding display region in all display regions based on a spatial location of a display device in the splicing screen display system, and establish a correspondence.

In some embodiments, the main control end device receives a sequence that is of displaying controlled end device identifiers in terms of time and that is preconfigured by the user, and sequentially displays the controlled end device identifiers based on the preset time sequence. In this case, in the splicing screen scenario, the user can determine a controlled end device corresponding to a controlled end device identifier based on a time sequence of displaying the controlled end device identifier or an arrangement sequence of displaying the controlled end device identifier. Therefore, in a scenario where there are many controlled end devices, the user does not need to confirm the controlled end device identifiers one by one, or the main control end device does not need to display the controlled end device identifiers when displaying identification information (for example, two-dimensional code images) of the controlled end devices.

Figure 15:
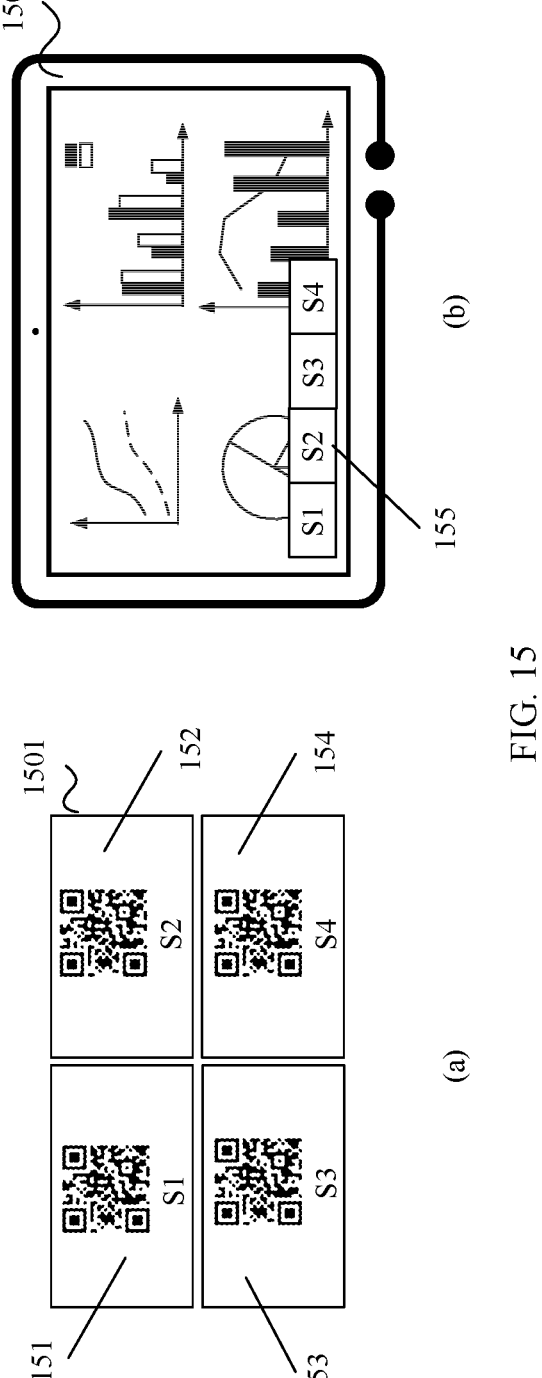
FIG. 15 is a schematic diagram 10 of an interface according to an embodiment of this application.

For example, for a controlled end device 1501 shown in (a) in FIG. 15, it is assumed that the controlled end device 1501 is a splicing screen and includes four displays, that is, the controlled end device 1501 is a splicing screen display system including four display devices (namely, controlled end devices). A time sequence in which the user preconfigures display device identifiers is sequentially a display device 151 (where a display device identifier is S1), a display device 152 (where a display device identifier is S2), a display device 153 (where a display device identifier is S3), and a display device 154 (where a display device identifier is S4). In this case, on an interface 1502 shown in (b) in FIG. 15, the main control end device sequentially displays four display device identifiers S1 to S4 or sequentially displays S1 to S4 from left to right (where an arrangement sequence of the identifiers is from left to right) shown by a reference numeral 155. The user knows the time sequence of displaying the display device identifiers. Therefore, it can be directly determined that the display device identifier S1 corresponds to the display device 151, the display device identifier S2 corresponds to the display device 152, the display device identifier S3 corresponds to the display device 153, and the display device identifier S4 corresponds to the display device 154. In this way, a correspondence between a display region and a display device can be established.

In some embodiments, in a process of displaying a controlled end device identifier, after detecting an operation of touching the controlled end device identifier by the user, the main control end device sends a signal to a corresponding controlled end device. After receiving the signal, the controlled end device prompts the user of a currently configured controlled end device by displaying prompt information on a display, by blinking an indicator, or the like. In this way, the user does not need to confirm the controlled end device identifier. This helps further reduce user operation difficulty.

In some embodiments, the main control end device determines setting performed by the user on a preset configuration sequence of configuring the controlled end devices in terms of time, and in the process of determining the display region in step S405, prompts the user to select the display region based on the preset configuration sequence. In this case, after determining all the display regions, the main control end device may directly establish a correspondence between the display regions and the corresponding controlled end devices, and in step S406, the controlled end device identifier does not need to be displayed, and an operation of establishing a correspondence (for example, an operation of dragging the controlled end device identifier) by the user is detected. The preset configuration sequence may be determined by the user before the controlled end devices are configured, or may be a sequence in which the user obtains the identification information of the controlled end devices in step S404.

For example, for the controlled end device 1501 shown in (a) in FIG. 15, it is assumed that the user presets a configuration time sequence of the display devices as follows: the display device 151, the display device 152, the display device 153, and the display device 154. After receiving the display configuration operation of the user in step S401, the main control end device obtains the configuration sequence and obtains the identification information of the display devices in step S404. Then, in step S405, the user is prompted to sequentially select a display region based on the configuration sequence. Then, after determining that the user completes selecting a first display region, the main control end device establishes a correspondence between the first display region and the display device 151. Then, after determining that the user completes selecting a second display region, the main control end device establishes a correspondence between the second display region and the display device 152. In this way, correspondences of the four displays are established in sequence. That is, in step S405, the main control end device receives an operation of determining the display region based on the preset configuration sequence by the user, so that the correspondence between the display region and the display device can be established, and step S406 does not need to be performed.

In some embodiments, in the foregoing step S404, after a display of one controlled end device is scanned, the main control end device prompts the user to perform step S405 to select a display region. After the user completes the selection, the main control end device directly establishes a correspondence between the controlled end device and the display region. The main control end device repeats the foregoing steps to complete establishment of all correspondences. That is, the main control end device may scan a display of one controlled end device at a time, and when there are displays of N controlled end devices, step S404 and step S405 are repeatedly performed N times. Each time step S405 is performed, the main control end device directly establishes a correspondence between a controlled end device corresponding to identification information collected this time and a display region determined this time. In the current scenario, the main control end device does not need to detect the operation of establishing the correspondence (for example, the operation of dragging the controlled end device identifier) by the user.

In some embodiments, a same display region of the main control end device may correspond to different identity information of controlled end devices, and same identity information of controlled end devices may alternatively correspond to different display regions of the main control end device. That is, a correspondence between the display region of the main control end device and the identification information of the controlled end device may be any one or more of one-to-one, many-to-one, one-to-many, and many-to-many correspondences.

Figure 16:
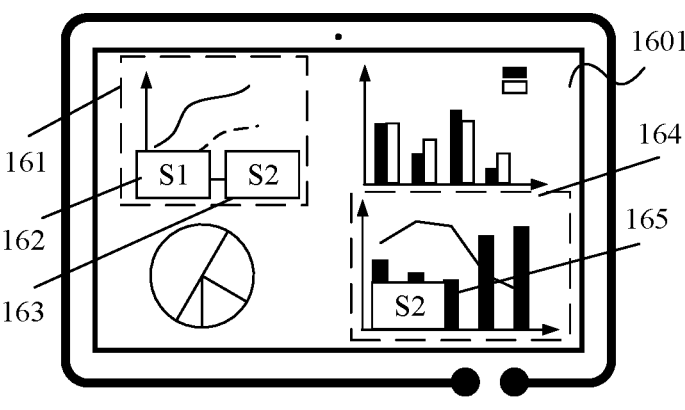
FIG. 16 is a schematic diagram 11 of an interface according to an embodiment of this application.

For example, after the main control end device detects the operation of dragging the controlled end device identifier by the user, the controlled end device identifier is still displayed on the display of the main control end device at a location where the controlled end device identifier is originally displayed, so that the user is allowed to drag the same controlled end device identifier a plurality of times. On an interface 1601 shown in FIG. 16, the main control end device determines that a display region 161 includes a controlled end device identifier 162 and a controlled end device identifier 163, that is, establishes a correspondence between the display region 161 and a controlled end device S1 corresponding to the controlled end device identifier 162, and establishes a correspondence between the display region 161 and a controlled end device S2 corresponding to the controlled end device identifier 163. Therefore, in the following step S409, different controlled end devices (for example, S1 and S2) can display display content of a same display region (for example, the display region 161). On the interface 1601 shown in FIG. 16, if the main control end device determines that a display region 164 includes a controlled end device identifier 165, and the controlled end device identifier 165 also corresponds to the controlled end device S2, a correspondence between the display region 164 and the controlled end device S2 corresponding to the controlled end device identifier 165 is established. Therefore, in the following step S409, a same controlled end (for example, S2) can display display content of different display regions (for example, the display region 161 and the display region 164). For example, different display content is displayed on split screens, or different display content is separately and directly displayed on a same display.

In some embodiments, in the process of establishing the correspondence, the main control end device prompts, by displaying prompt information, by using a voice prompt, or the like, the user how to operate to establish the correspondence between the display region and the identification information of the controlled end device. For example, the main control end device prompts the user to drag the controlled end device identifier to the corresponding display region.

In some embodiments, the main control end device displays the controlled end device identifier, and if the main control end device detects an operation of dragging the controlled end device identifier to a location by the user, the main control end device directly determines (that is, intelligently identifies) a display region corresponding to the location, and establishes a correspondence between the display region and identification information of a controlled end corresponding to the controlled end device identifier. That is, the main control end device does not need to perform the foregoing step S405.

S407: The main control end device sends the correspondence to the controlled end device.

In some embodiments, after determining the correspondence between the display region and the identification information of the controlled end device, the main control end device sends the corresponding correspondence to the controlled end device, where the correspondence may be sent in a manner of a broadcast packet or a multicast packet. For example, the correspondence is carried in a packet. For example, the sending manner may be a BLE broadcast manner, a UDP broadcast or multicast manner, or the like. Correspondingly, the controlled end device can listen to the broadcast or multicast packet and receive the correspondence. Optionally, the main control end device sends the correspondence in the manner of the broadcast packet or the multicast packet. Therefore, the correspondence corresponding to all the controlled end devices should be carried in the packet. Based on this, the main control end device may configure the identification information and corresponding display region information in adjacent fields, so that in step S409 subsequently, the controlled end device can determine, based on whether identification information matches, display region information corresponding to an adjacent field based on a field of the matched identification information.

Figure 17:
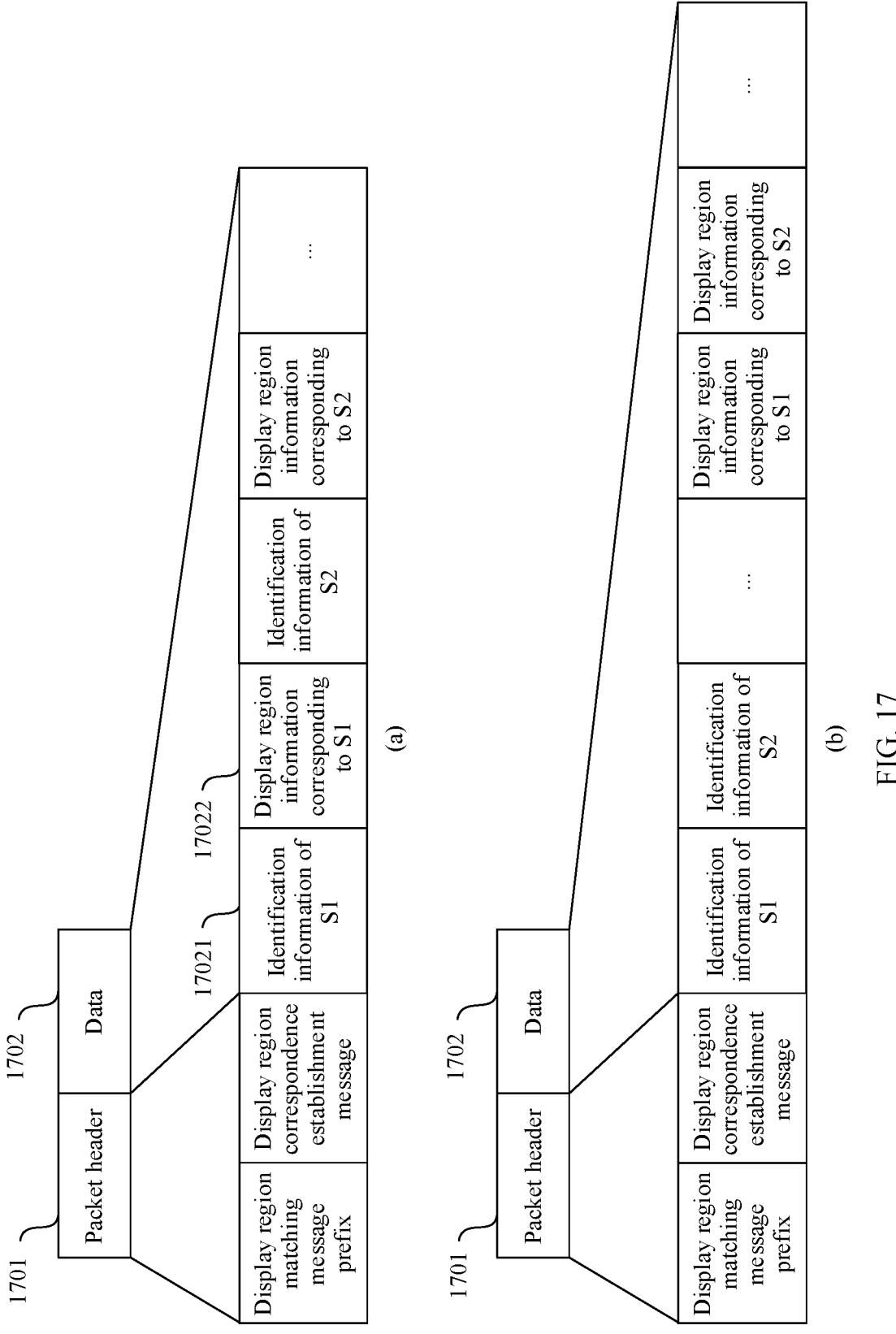
FIG. 17 is a schematic diagram 2 of a structure of a packet according to an embodiment of this application.

For example, FIG. 17 shows another structure of a packet including a packet header and data of the packet according to an embodiment of this application. As shown in (a) in FIG. 17, the packet is used to carry a correspondence. For example, a packet header field 1701 carries an identification digit of a display region matching message prefix and an identification digit of a display region correspondence establishment message, where the identification digit indicates that a message type corresponding to the current packet is a display configuration message, so as to trigger a controlled end device to perform display region matching and establish a correspondence with a corresponding display region. A data field 1702 carries identification information of the controlled end device and corresponding display region information. The display region information includes location information of the display region, for example, pixel coordinates of the display region. Optionally, the identification digit may be a prefix (for example, the identification digit of the display region matching message prefix carried in the packet header), a suffix, or a field located in another location of the packet.

In some embodiments, a broadcast/multicast cycle of the correspondence is preset, and the main control end device sends the correspondence based on the preset broadcast/multicast cycle. In this way, it is ensured that all controlled end devices can obtain the correspondence through listening. In addition, after the correspondence changes, the controlled end devices can obtain a latest correspondence through listening.

In this way, the main control end device sends the correspondence in a multicast or broadcast manner, and does not need to send the correspondence to the controlled end device a plurality of times separately. This effectively reduces signaling overheads.

S408: The main control end device sends display image data to the controlled end device.

In some embodiments, after determining the correspondence between the display region and the identification information of the controlled end device, the main control end device sends the display image data to the controlled end device, where the display image data is data corresponding to display content on a display of the main control end device. The display image data is sent in a manner of a broadcast packet or a multicast packet. For example, the display image data is carried in a packet. For example, the sending manner may be a UDP broadcast or multicast manner. Correspondingly, the controlled end device can listen to the broadcast or multicast packet, and receive the display image data.

In some embodiments, a broadcast/multicast cycle for sending the display image data is preset, and the main control end device sends the display image data based on the preset broadcast/multicast cycle. Therefore, when the display image data changes, the controlled end device can also synchronously display changed display image data.

In this way, the main control end device does not need to process the image data, for example, segment the image data, and send segmented image data to a corresponding controlled end device for display. Instead, the complete image data is sent to all controlled end devices in a broadcast or multicast manner, so that power consumption generated when the main control end device processes the data can be effectively reduced, and a data transmission process can be simplified. In addition, the main control end device does not need to establish a one-to-one data transmission channel to each controlled end device, but sends the complete image data in the broadcast/multicast manner. This reduces signaling overheads.

It should be noted that an execution sequence of step S407 and step S408 is not limited in this embodiment of this application. For example, after determining the correspondence between the display region and the identification information of the controlled end device, the main control end device may first send the correspondence to the controlled end device, and then send the display image data to the controlled end device (that is, step S407 is first performed, and then step S408 is performed). Alternatively, after determining the correspondence between the display region and the identification information of the controlled end device, the main control end device may first send the display image data to the controlled end device, and then send the correspondence to the controlled end device (that is, step S408 is first performed, and then step S407 is performed). Alternatively, after determining the correspondence between the display region and the identification information of the controlled end device, when the correspondence is sent to the controlled end device, the main control end device may send the display image data to the controlled end device (that is, step S407 and step S408 are performed in parallel).

S409: The controlled end device displays corresponding display content based on the correspondence.

In some embodiments, the main control end device sends, in a broadcast or multicast manner, a packet that carries the correspondence, and all the controlled end devices can receive the packet. After receiving the packet, the controlled end device parses packet data, identifies an identification digit of a field that includes identification information, and performs matching on the identification information if determining that the field is used to carry the identification information. If the read identification information is the same as the identification information of the controlled end device, it is determined that display region information corresponding to the identification information is required display region information. For example, after receiving the correspondence, the controlled end device can obtain pixel coordinates of a display region based on the correspondence. Specifically, the packet may include the identification information and a display region. After obtaining the identification information through matching, the controlled end device obtains the display region from a corresponding field, and determines to-be-displayed image data based on the display region (for example, including the pixel coordinates), to implement display.

For example, as shown in (a) in FIG. 17, it is assumed that the controlled end device is S1. After receiving the packet, the controlled end device parses the packet data to obtain the display region corresponding to the identification information. The identification information and the display region that has the correspondence with the identification information are corresponding field content. Corresponding fields may be adjacent fields shown in (a) in FIG. 17, may be fields corresponding to sequential locations shown in (b) in FIG. 17, or may be fields having another correspondence.

For example, if the controlled end device identifies, based on an identification digit of a field including identification information, identification information carried in a field 17021, and the identification information matches the identification information of the controlled end device, the controlled end device parses data of a corresponding display region field 17022 to obtain corresponding display region information. Optionally, a field carrying identification information and a field carrying display region information of a display region having a correspondence are adjacent fields (for example, the field 17021 and the field 17022 in FIG. 17 are adjacent fields). After determining that identification information carried in a field is the same as the identification information of the controlled end device, the controlled end device may obtain corresponding display region information in an adjacent field.

For another example, the packet carrying the correspondence may alternatively be a packet format shown in (b) in FIG. 17. In a data field, the identification information of the controlled end devices is first arranged in sequence (for example, a field sequence of the identification information is configured based on a sequence of numbers of the controlled end devices, or a field sequence of the identification information is randomly configured). Then, a sequence of corresponding display region information fields is sequentially configured based on the field sequence of the identification information. As shown in (b) in FIG. 17, if the sequence corresponding to the identification information fields in the data field is an identification information field of S1, an identification information field of S2, . . . , a sequence corresponding to display region information fields in the data field is a display region information field corresponding to S1, a display region information field corresponding to S2, . . . . In this way, after parsing the packet, the controlled end device can determine the corresponding display region information field based on a sequence location of a field of the matched identification information, so as to obtain corresponding display region information. If the controlled end device (where a display is S1) determines that identification information of S1 is in a first place, display region information of S1 is correspondingly obtained in a first field corresponding to the display region information field. Alternatively, an identification digit may be carried in an identification information field, to indicate a location of corresponding display region information.

In some embodiments, after determining display region information based on the correspondence, the controlled end device processes display image data based on the display region information, to display the corresponding display content. For example, the controlled end device determines the pixel coordinates of the display region based on the correspondence, and obtains the display image data corresponding to the pixel coordinates, and then, processes the corresponding image data based on resolution, a screen ratio, and the like of a display of the controlled end device, so as to display the corresponding display content. For example, when screen ratios of the main control end device and the controlled end device are different, the controlled end device may process a display image based on a screen ratio of the main control end device, and then display the image. For example, based on the screen ratio, the controlled end device fills, with a black border, a region that is not displayed in the display image, or displays the display image after cropping the display image.

Figure 18:
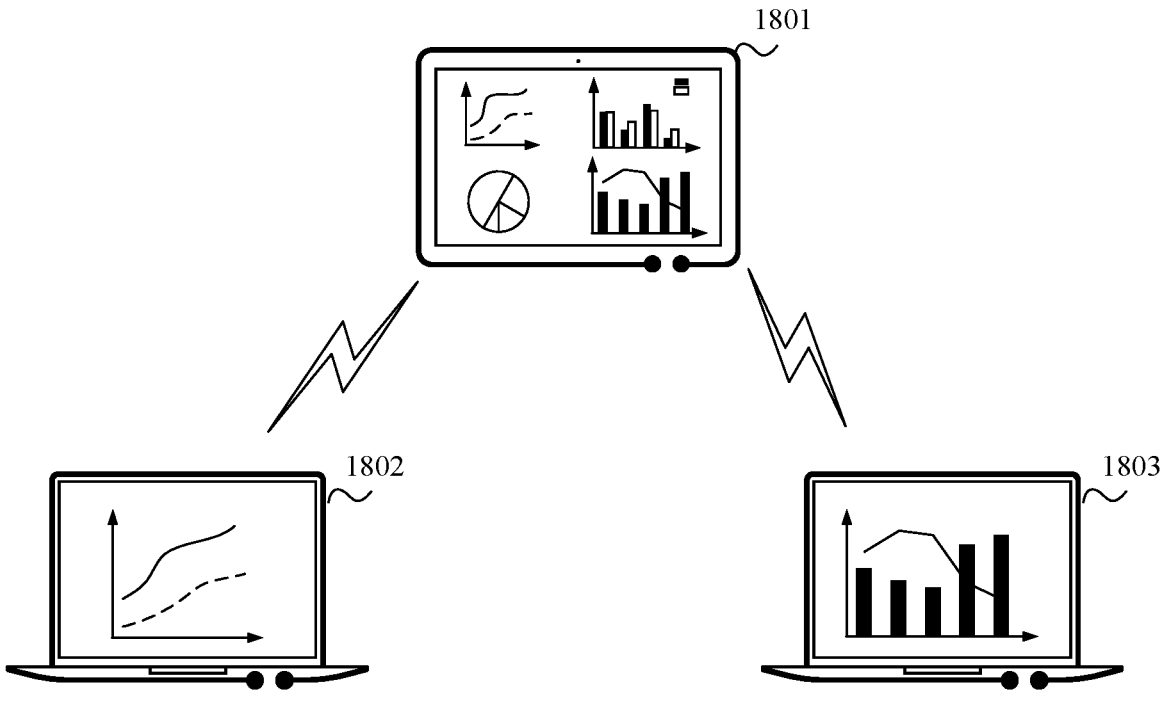
FIG. 18 is a schematic diagram 12 of an interface according to an embodiment of this application.

For example, as shown in FIG. 18, corresponding to the scenarios shown in FIG. 7 to FIG. 13, after receiving a correspondence and display image data that are sent by a main control end device 1801, a controlled end device 1802 and a controlled end device 1803 implements display of display content of a part of a display region on a display of the main control end device 1801 based on the correspondence.

In this way, according to the display method provided in this embodiment of this application, a correspondence between a display region of a main control end device and identification information of a controlled end device can be established, so that display content of the corresponding display region of the main control end device can be displayed by using different controlled end devices. This reduces operation difficulty of configuring the controlled end device by a user and effectively improves user experience.

In addition, the main control end device sends a correspondence and display image data to the controlled end device by sending a broadcast or multicast packet. This can reduce power consumption of the main control end device and reduce signaling overheads.

In addition, the display method provided in this embodiment of this application is not only applicable to a splicing screen display setting scenario, but also applicable to a distributed display setting scenario, and can meet a requirement of a user for display setting of a controlled end device in different scenarios.

Figure 19:
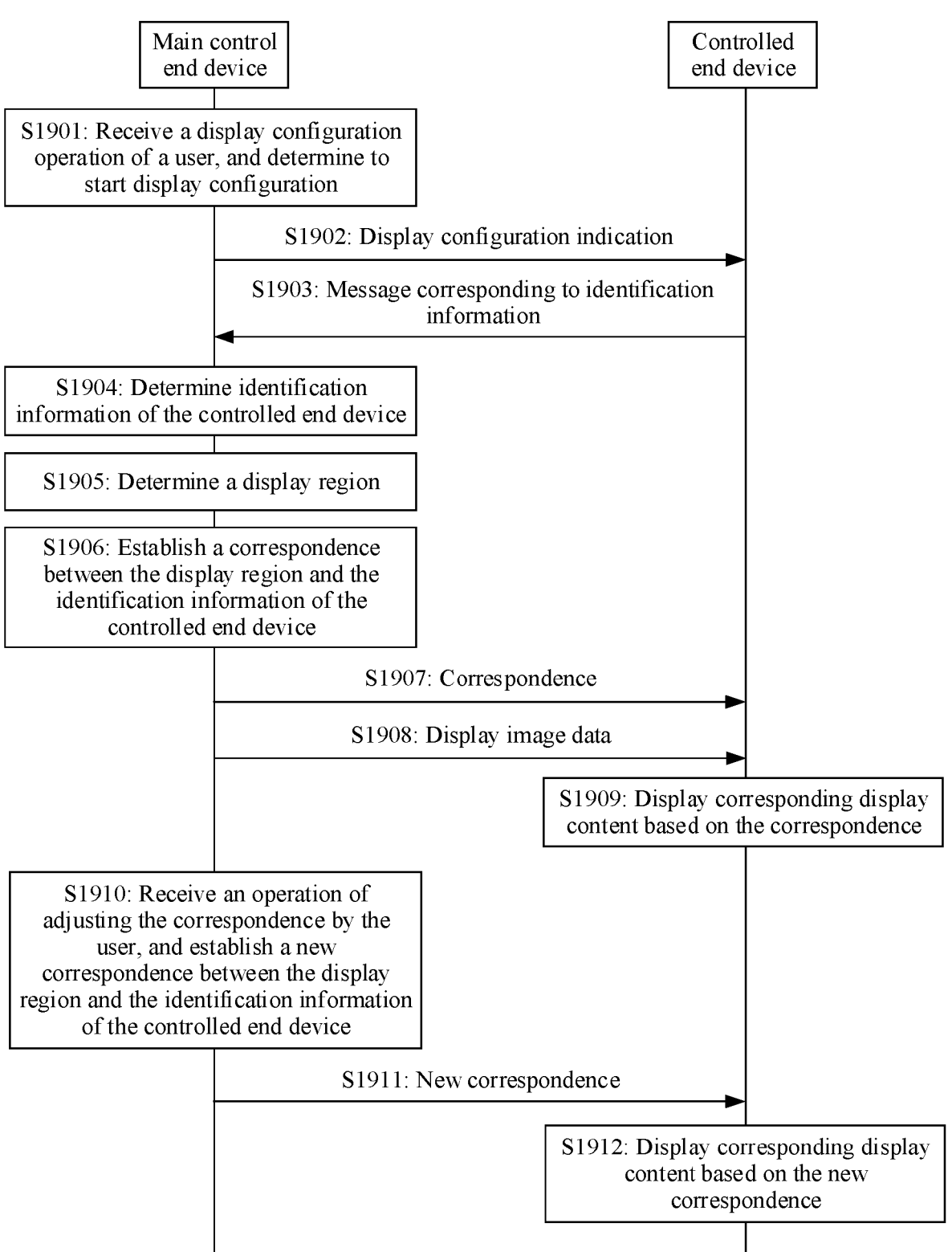
FIG. 19 is a flowchart 2 of a display method according to an embodiment of this application.

In some scenarios, the main control end device may alternatively allocate a corresponding display region to the controlled end device in a random allocation manner, and then receive an operation of modifying a correspondence by the user to obtain a correct correspondence. FIG. 19 is a schematic diagram of another display method according to an embodiment of this application. As shown in FIG. 19, the method may include S1901 to S1912.

S1901: A main control end device receives a display configuration operation of a user, and determines to start display configuration.

Optionally, for step S1901, refer to related descriptions of step S401. Details are not described herein again.

S1902: The main control end device sends a display configuration indication to a controlled end device.

In some embodiments, after determining to start configuring a display, the main control end device sends the display configuration indication to the controlled end device, where the display configuration indication is sent in a manner of a broadcast packet or a multicast packet. For example, the display configuration indication may be sent in a BLE broadcast manner, a UDP broadcast or multicast manner, or the like. Correspondingly, after being started, the controlled end device starts message listening, and receives the display configuration indication after obtaining, through listening, the display configuration indication sent in a broadcast or multicast manner.

Figures 20, 21:
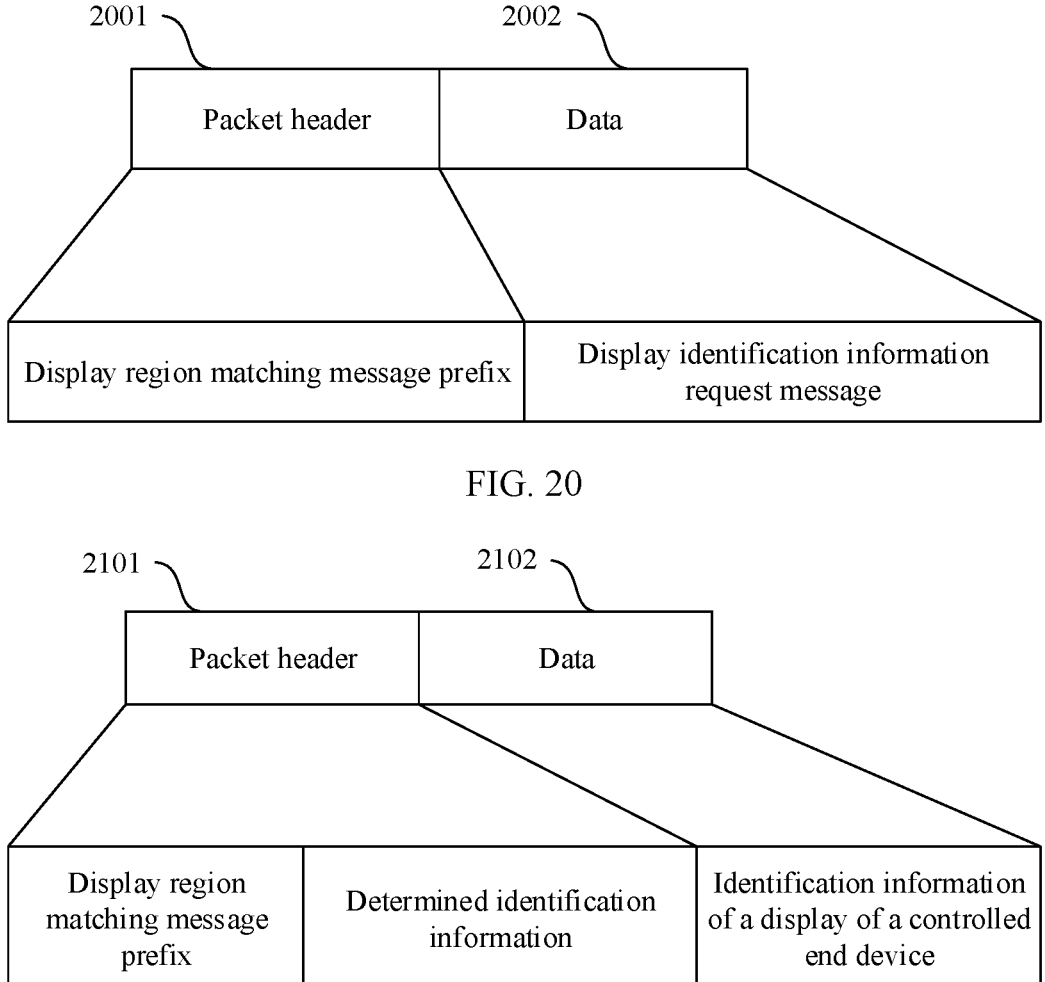
FIG. 20 is a schematic diagram 3 of a structure of a packet according to an embodiment of this application.
FIG. 21 is a schematic diagram 4 of a structure of a packet according to an embodiment of this application.

For example, FIG. 20 shows a structure of a packet including a packet header and data of the packet according to an embodiment of this application. As shown in FIG. 20, the packet is used to carry the display configuration indication. For example, a packet header field 2001 carries an identification digit of a display region matching message prefix, and the identification digit indicates that a message type corresponding to the current packet is a display configuration message, so as to trigger the controlled end device to perform display region matching. A data field 2002 carries a display identification information request message indicating the controlled end device to start a display configuration process and request the controlled end device to send identification information of a display. Optionally, the identification digit may be a prefix (for example, the identification digit of the display region matching message prefix carried in the packet header), a suffix, or a field located in another location of the packet.

In this way, the main control end device sends the display configuration indication in the multicast or broadcast manner. This can effectively reduce signaling overheads.

Optionally, for remaining content of S1902, refer to related descriptions of S402. Details are not described herein again.

S1903: The controlled end device sends a message corresponding to the identification information to the main control end device.

In some embodiments, after the controlled end device receives the display configuration indication, if the controlled end device determines to start the display configuration process, the message corresponding to the identification information is sent to the main control end device based on the display configuration indication, and the message carries identification information of the controlled end device. For example, each display device in a splicing screen sends a message carrying identification information corresponding to each display device to the main control end device. For another example, if the controlled end device is a device in a distributed display scenario, the message carrying the identification information corresponding to the controlled end device is directly sent to the main control end device. Correspondingly, the main control end device receives the message that corresponds to the identification information and that is sent by the controlled end device.

The identification information is unique identification information of the controlled end device, and indicates the controlled end device. For example, the identification information is a BLE address, an IP address, or the like of the controlled end device.

For example, FIG. 21 shows another structure of a packet including a packet header and data of the packet according to an embodiment of this application. As shown in FIG. 21, the packet is used to carry a message corresponding to identification information. For example, a packet header field 2101 carries an identification digit of a display region matching message prefix and an identification digit of determining identification information, where the identification digits indicate that a message type corresponding to the current packet is a display configuration message, so as to trigger the main control end device to perform display region matching and determine the carried identification information of the controlled end device. A data field 2202 carries the identification information of the controlled end device. Optionally, the identification digit may be a prefix (for example, the identification digit of the display region matching message prefix carried in the packet header), a suffix, or a field located in another location of the packet.

S1904: The main control end device determines the identification information of the controlled end device.

In some embodiments, after receiving the message corresponding to the identification information, the main control end device parses the message to obtain the identification information of the controlled end device carried in the message, so as to establish a correspondence between a display region and the controlled end device in step S1906 subsequently.

S1905: The main control end device determines the display region.

In some embodiments, the main control end device may receive an operation of determining the display region by the user, and determine the display region. Alternatively, the main control end device randomly divides the display region.

Optionally, for remaining content of S1905, refer to related descriptions of S405. Details are not described herein again.

It should be noted that an execution sequence of step S1902 to step S1904 and step S1905 is not limited in this embodiment of this application. For example, after receiving the display configuration operation of the user, the main control end device first sends the display configuration indication to the controlled end device, and after determining the identification information of the controlled end device based on the message corresponding to the identification information, receives the operation of determining the display region by the user (that is, step S1902 to step S1904 are first performed, and then step S1905 is performed). Alternatively, after receiving the display configuration operation of the user, the main control end device first receives the operation of determining the display region by the user to determine the display region, and then sends the display configuration indication to the controlled end device, so as to determine the identification information of the controlled end device (that is, step S1905 is first performed, and then step S1902 to step S1904 are performed). Alternatively, after receiving the display configuration operation of the user, when the display configuration indication is sent to the controlled end device, the main control end device receives the operation of determining the display region by the user (that is, step S1902 to step S1904 and step S1905 are performed in parallel).

S1906: The main control end device establishes a correspondence between the display region and the identification information of the controlled end device.

In some embodiments, the main control end device receives the identification information of the controlled end device, but does not know specific location information of the controlled end device, and the user cannot determine corresponding location information based on the identification information. Therefore, the main control end device may allocate the display region to the controlled end device in a random allocation manner. That is, the main control end device randomly establishes a correspondence between the display region and the identification information of the controlled end device.

S1907: The main control end device sends the correspondence to the controlled end device.

S1908: The main control end device sends display image data to the controlled end device.

Optionally, for step S1907 and step S1908, refer to related descriptions of step S407 and step S408. Details are not described herein again.

S1909: The controlled end device displays corresponding display content based on the correspondence.

In some embodiments, the main control end device sends, in the broadcast or multicast manner, a packet that carries the correspondence. After receiving the packet, the controlled end device parses packet data, so as to obtain display region information based on the correspondence, and then, processes display image data based on the display region information, to display the corresponding display content. However, because the correspondence is a randomly allocated correspondence, a display exception may occur.

Figure 22:
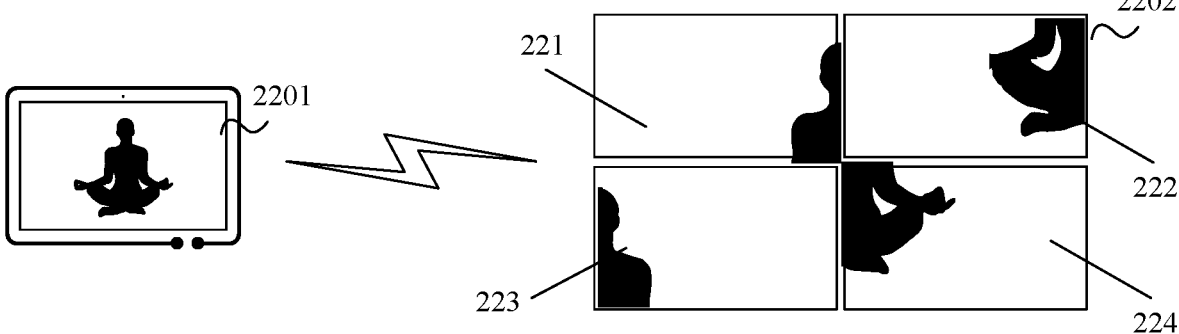
FIG. 22 is a schematic diagram 13 of an interface according to an embodiment of this application.

For example, as shown in FIG. 22, it is assumed that a main control end device 2201 sends display content to a controlled end device 2202 for display, and the controlled end device 2202 is a splicing screen, including a display device 221, a display device 222, a display device 223, and a display device 224. If the main control end device 2201 randomly allocates a correspondence between display regions and the four display devices, as shown in FIG. 22, a display exception due to an incorrect correspondence may occur when the controlled end device displays an image. For example, an exception that display content of the display device 222 and display content of the display device 223 are misplaced may occur.

Optionally, for step S1909, refer to related descriptions of step S409. Details are not described herein again.

S1910: The main control end device receives an operation of adjusting the correspondence by the user, and establishes a new correspondence between the display region and the identification information of the controlled end device.

In some embodiments, after the controlled end device displays the image, the user may intuitively see whether there is a display with a display exception, and if there is a display with a display exception, the corresponding display exception is directly corrected. Specifically, the main control end device detects the operation of adjusting the correspondence by the user, and in response to the operation, the main control end device establishes the new correspondence between the display region and the identification information of the controlled end device (namely, a new correspondence determined after a part or all of the original correspondences are adjusted). The operation of adjusting the correspondence includes, for example, a sliding operation performed by the user on a main control end display, a voice indication operation, or the like.

Figure 23:
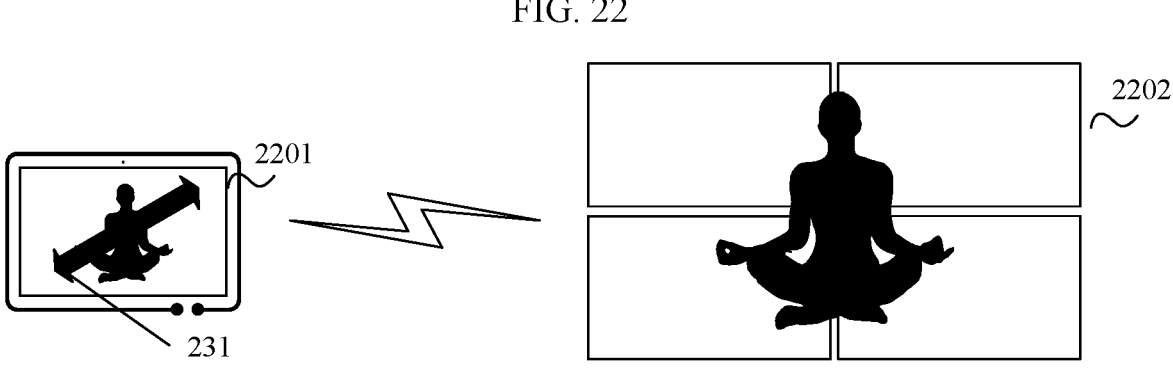
FIG. 23 is a schematic diagram 14 of an interface according to an embodiment of this application.

For example, corresponding to the scenario shown in FIG. 22, a display device with a display exception exists in the controlled end device. For example, the display device 222 displays content that should be displayed by the display device 223, and the display device 223 displays content that should be displayed by the display device 222. If as shown in FIG. 23, the main control end device 2201 detects the sliding operation performed by the user on the display along a diagonal direction of the display shown by an arrow 231, a display region corresponding to the display device 222 and a display region of the display device 223 of the controlled end device 2202 can be exchanged, and a new adjusted correspondence is established, as shown in FIG. 22.

S1911: The main control end device sends the new correspondence to the controlled end device.

In some embodiments, the main control end device sends, in a broadcast or multicast manner, a packet that carries the new correspondence. For a packet format, refer to the packet format shown in FIG. 17 in step S407. Correspondingly, the controlled end device listens to the broadcast or multicast packet, matches an identification digit in the packet, and obtains corresponding display region information.

In some embodiments, the main control end device carries all the correspondences in the packet after updating the correspondence, where all the correspondences include the updated correspondence. Alternatively, after updating the correspondence, the main control end device carries only the updated correspondence in the packet.

S1912: The controlled end device displays corresponding display content based on the new correspondence.

In some embodiments, the controlled end device listens to the packet. If it is determined that the packet carries matched identification information, new display region information is obtained, the previous display region information is deleted, and the new display region information is re-stored.

In some embodiments, after obtaining new correspondence information, the controlled end device processes, based on display region information in the new correspondence, the image data obtained in step S1908, and performs display again.

For example, as shown in FIG. 23, after displaying the corresponding display content based on the new correspondence, a display of the controlled end device 2202 can display a complete and ordered image.

Optionally, for step S1912, refer to related descriptions of step S409. Details are not described herein again.

In some scenarios, it can be learned from step S402 to step S404 shown in FIG. 4 and step S1902 to step S1904 shown in FIG. 19 that a main control end device can determine, based on whether the main control end device has an image collection capability, to send a display configuration message or a display configuration indication to a controlled end device. For example, in a case in which an image collecting apparatus (such as a camera) is configured in the main control end device, the main control end device sends a display configuration message to the controlled end device, and then collects, by using the image collecting apparatus of the main control end device, identification information displayed by the controlled end device, so as to obtain the corresponding identification information. Alternatively, the main control end device may send a display configuration indication to the controlled end device, and obtain corresponding identification information based on a message corresponding to received identification information. For another example, in a case in which no image collecting apparatus (such as a camera) is configured in the main control end device, the main control end device sends a display configuration indication to the controlled end device, and obtains corresponding identification information based on a message corresponding to received identification information.

In this way, the main control end device randomly matches a correspondence between a display region and the controlled end device, so that in step S1906, the user does not need to establish the correspondence one by one. This reduces user operations. In addition, in an intuitive display manner, the user is helped to correct the correspondence, so as to reduce user operation difficulty, increase interests of a user operation, improve efficiency of establishing the correspondence, and improve user experience.

For example, FIG. 24 is a schematic diagram of a method for determining projection display content according to an embodiment of this application. As shown in FIG. 24, the method may include S2401 to S2403.

S2401: A first electronic device displays a first user interface, where the first user interface includes first display content, a first closed box, and a second closed box.

In some embodiments, display content in the first closed box and the second closed box is a part or all of the first display content.

For example, on the interface 904 shown in (d) in FIG. 9, the display region selection box 93 is the first closed box, the display region selection box 96 is the second closed box, and the display content in the first closed box and the second closed box is a part that is of the first display content and that is displayed on the interface 904.

In some embodiments, the first closed box and/or second closed box are/is determined in response to an operation of drawing a closed track by a user. The first electronic device receives a closed graphic gesture operation (namely, the operation of drawing the closed track by the user) performed by the user on the display. In response to the closed graphic gesture operation of the user, a display region in a closed graphic region is determined as a display region for which a correspondence is to be established. Further, after detecting the closed graphic gesture operation, the first electronic device automatically performs smooth processing on a corresponding closed graphic, and determines the corresponding display region.

Optionally, for step S2401, refer to content shown in FIG. 9 and related descriptions of a corresponding step. Details are not described herein again.

S2402: The first electronic device displays a second user interface, where the second user interface includes the first display content, the first closed box, the second closed box, a first control, and a second control.

In some embodiments, the first control and the second control are movable controls, the first control corresponds to a second electronic device, the second control corresponds to a third electronic device, and the second electronic device and the third electronic device are projection display content receiving devices of the first electronic device.

For example, in the scenarios shown in FIG. 7 and FIG. 10, on the interface 1003 shown in (c) in FIG. 10, the dashed-line box 103 is the first closed box, the dashed-line box 105 is the second closed box, the identifier S1 indicated by the reference numeral 101 is the first control, and the identifier S2 indicated by the reference numeral 104 is the second control.

In some embodiments, the first control includes a serial number and/or an icon of the second electronic device, and the second control includes a serial number and/or an icon of the third electronic device.

For example, on the interface 1003 shown in (c) in FIG. 10, the identifier S1 indicated by the reference numeral 101 is the first control, and the first control corresponds to an identifier (for example, a number) of the controlled end device 702 in FIG. 7; and the identifier S2 indicated by the reference numeral 104 is the second control, and the second control corresponds to an identifier (for example, a number) of the controlled end device 703 in FIG. 7.

For another example, as shown in FIG. 12 or FIG. 13, the first control includes the number and the icon of the second electronic device, and the second control includes the number and the icon of the third electronic device.

In some embodiments, a location relationship between the first control and the second control on the second user interface corresponds to a spatial location relationship between the second electronic device and the third electronic device.

Figure 14:
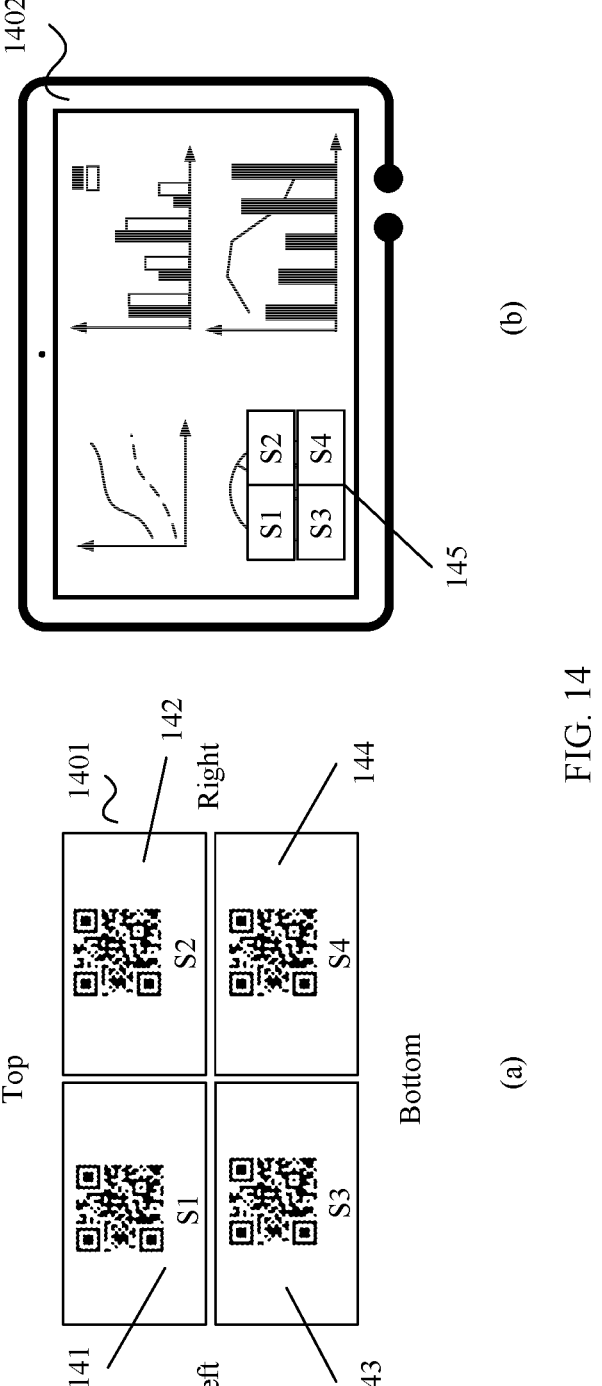
FIG. 14 is a schematic diagram 9 of an interface according to an embodiment of this application.

For example, on the interface shown in (b) in FIG. 14, the location relationship between the first control and the second control (namely, a location relationship identified by the reference numeral 145) corresponds to a spatial location relationship between display devices (namely, the second electronic device and the third electronic device) in the splicing screen display system shown in (a) in FIG. 14.

Optionally, for step S2402, refer to content shown in FIG. 10 to FIG. 16 and related descriptions of a corresponding step. Details are not described herein again.

S2403: The first electronic device receives a first operation performed by the user on the first control and the second control, and displays the first control and/or the second control in the first closed box and/or the second closed box.

In some embodiments, the first operation includes one or more of a drag operation, a touch and hold operation, and a tap operation.

In some embodiments, display content in a closed box in which the first control is located is display content of the second electronic device, and display content in a closed box in which the second control is located is display content of the third electronic device.

For example, in the interfaces shown in FIG. 11, FIG. 12, and FIG. 13, if the first control or the second control is displayed in a closed box corresponding to a display region, a correspondence between identification information of a controlled end device (for example, the second electronic device or the third electronic device) corresponding to the first control or the second control and the display region is established. In this case, the controlled end device corresponding to the first control or the second control displays display content in the corresponding display region.

Optionally, for step S2403, refer to content shown in FIG. 10 to FIG. 16 and related descriptions of a corresponding step. Details are not described herein again.

In some scenarios, before step S2401, the first electronic device displays a third user interface, where the third user interface includes a first initial closed box and the first display content; and receives a second operation performed by the user on the first initial closed box, and displays the first closed box after changing a location and/or a size of the first initial closed box.

For example, on the interface shown in FIG. 8 or FIG. 9, the first electronic device displays the first initial closed box, and displays, in response to the second operation performed by the user on the first initial closed box, the first closed box after changing the location and the size of the first initial closed box. The first initial closed box indicated by the reference numeral 91 displayed on the interface 901 shown in (a) in FIG. 9 displays, in response to the second operation performed by the user, the first closed box indicated by the reference numeral 93 displayed on the interface shown in (b) in FIG. 9.

In some scenarios, before step S2401, the first electronic device determines, based on a quantity of projection display content receiving devices, a same quantity of closed boxes as the quantity of projection display content receiving devices, where the closed boxes include the first closed box and the second closed box.

For example, as shown in FIG. 10, based on the scenario shown in FIG. 7, when the first electronic device obtains identification information of two controlled end devices (the controlled end device 702 and the controlled end device 703 shown in FIG. 7), it is determined that the quantity of projection display content receiving devices is 2, and two closed boxes (for example, the dashed-line box 103 and the dashed-line box 105) are further determined.

For technical effect of the first electronic device shown in FIG. 24, refer to technical effect of the display methods in the foregoing method embodiments. Details are not described herein again.

The display methods provided in embodiments of this application are described above in detail with reference to FIG. 4 to FIG. 24. The following describes in detail a display apparatus provided in an embodiment of this application with reference to FIG. 25 and FIG. 26.

In a possible design, FIG. 25 is a schematic diagram of a structure of a first electronic device according to an embodiment of this application. As shown in FIG. 25, the first electronic device 2500 may include a display unit 2501, a processing unit 2502, and a transceiver unit 2503. The first electronic device 2500 may be configured to implement functions of the first electronic device (for example, a main control end device) in the foregoing method embodiments.

Optionally, the display unit 2501 is configured to: support the first electronic device 2500 in displaying interface content; support the first electronic device 2500 in performing S401 and S405 in FIG. 4; support the first electronic device 2500 in performing S1901 in FIG. 19; and/or support the first electronic device 2500 in performing S2401, S2402, and S2403 in FIG. 24.

Optionally, the processing unit 2502 is configured to: support the first electronic device 2500 in performing S401, S405, and S406 in FIG. 4; and/or support the first electronic device 2500 in performing S1901, S1904, S1905, S1906, and S1910 in FIG. 19.

Optionally, the transceiver unit 2503 is configured to: support the first electronic device 2500 in performing S401, S402, S404, S405, S407, and S408 in FIG. 4; and/or support the first electronic device 2500 in performing S1902, S1903, S1907, S1908, and S1911 in FIG. 19.

The transceiver unit may include a receiving unit and a sending unit, may be implemented by a transceiver or a transceiver-related circuit component, and may be a transceiver or a transceiver module. Operations and/or functions of the units in the first electronic device 2500 are respectively intended to implement corresponding procedures of the display method in the foregoing method embodiments. All related content of the steps in the foregoing method embodiments may be referenced to function descriptions of corresponding function units. For brevity, details are not described herein again.

Optionally, the first electronic device 2500 shown in FIG. 25 may further include a storage unit (not shown in FIG. 25), and the storage unit stores a program or instructions. When the display unit 2501, the processing unit 2502, and the transceiver unit 2503 execute the program or the instructions, the first electronic device 2500 shown in FIG. 25 is enabled to perform the display method in the foregoing method embodiments.

For technical effect of the first electronic device 2500 shown in FIG. 25, refer to technical effect of the display method in the foregoing method embodiments. Details are not described herein again.

In addition to a form of the first electronic device 2500, the technical solution provided in this application may also be a function unit or a chip in the first electronic device, or an apparatus that matches the first electronic device.

Figure 26:
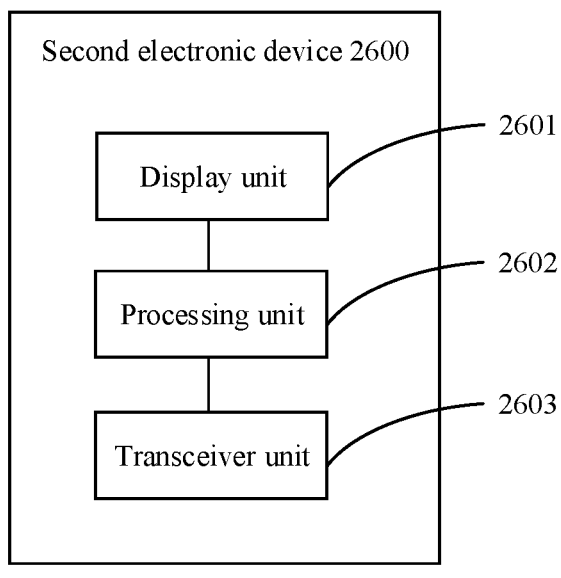
FIG. 26 is a schematic diagram of a structure of a second electronic device according to an embodiment of this application.

In a possible design, FIG. 26 is a schematic diagram of a structure of a second electronic device according to an embodiment of this application. As shown in FIG. 26, the second electronic device 2600 may include a display unit 2601, a processing unit 2602, and a transceiver unit 2603. The second electronic device 2600 may be configured to implement functions of the second electronic device (for example, a controlled end device) in the foregoing method embodiments.

Optionally, the display unit 2601 is configured to: support the second electronic device 2600 in displaying interface content; and/or support the second electronic device 2600 in performing S403 in FIG. 4.

Optionally, the processing unit 2602 is configured to: support the second electronic device 2600 in performing S409 in FIG. 4; and/or support the second electronic device 2600 in performing S1909 and S1912 in FIG. 19.

Optionally, the transceiver unit 2603 is configured to: support the second electronic device 2600 in performing S402, S407, and S408 in FIG. 4; and/or support the second electronic device 2600 in performing S1902, S1903, S1907, S1908, and S1911 in FIG. 19.

The transceiver unit may include a receiving unit and a sending unit, may be implemented by a transceiver or a transceiver-related circuit component, and may be a transceiver or a transceiver module. Operations and/or functions of the units in the second electronic device 2600 are respectively intended to implement corresponding procedures of the display method in the foregoing method embodiments. All related content of the steps in the foregoing method embodiments may be referenced to function descriptions of corresponding function units. For brevity, details are not described herein again.

Optionally, the second electronic device 2600 shown in FIG. 26 may further include a storage unit (not shown in FIG. 26), and the storage unit stores a program or instructions. When the display unit 2601, the processing unit 260/2, and the transceiver unit 2603 execute the program or the instructions, the second electronic device 2600 shown in FIG. 26 is enabled to perform the display method in the foregoing method embodiments.

For technical effect of the second electronic device 2600 shown in FIG. 26, refer to technical effect of the display method in the foregoing method embodiments. Details are not described herein again.

In addition to a form of the second electronic device 2600, the technical solution provided in this application may also be a function unit or a chip in the second electronic device, or an apparatus that matches the second electronic device.

An embodiment of this application further provides a chip system, including a processor. The processor is coupled to a memory. The memory is configured to store a program or instructions. When the program or the instructions is/are executed by the processor, the chip system is enabled to implement the method according to any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in embodiments of this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in embodiments of this application.

For example, the chip system may be a field programmable gate array (field programmable gate array, FPGA), an application-specific integrated circuit (application-specific integrated circuit, ASIC), a system on a chip (system on a chip, SoC), a central processing unit (central processing unit, CPU), a network processor (network processor, NP), a digital signal processor (digital signal processor, DSP), a microcontroller unit (micro controller unit, MCU), a programmable logic device (programmable logic device, PLD), or another integrated chip.

It should be understood that the steps in the foregoing method embodiments may be completed by using a hardware integrated logic circuit or instructions in a form of software in the processor. The steps of the methods disclosed with reference to embodiments of this application may be directly performed by a hardware processor, or may be performed by using a combination of hardware and software modules in the processor.

An embodiment of this application further provides a computer-readable storage medium. The computer-readable storage medium stores a computer program. When the computer program is run on a computer, the computer is enabled to perform the foregoing related steps, to implement the display method in the foregoing embodiments.

An embodiment of this application further provides a computer program product. When the computer program product runs on a computer, the computer is enabled to perform the foregoing related steps, to implement the display method in the foregoing embodiments.

In addition, an embodiment of this application further provides an apparatus. The apparatus may be specifically a component or a module, and the apparatus may include one or more processors and a memory that are connected to each other. The memory is configured to store a computer program. When the computer program is executed by the one or more processors, the apparatus is enabled to perform the display method in the foregoing method embodiments.

The apparatus, the computer-readable storage medium, the computer program product, or the chip provided in embodiments of this application are all configured to perform the corresponding method provided above. Therefore, for beneficial effects that can be achieved, refer to beneficial effects in the corresponding methods provided above. Details are not described herein again.

Method or algorithm steps described in combination with the content disclosed in embodiments of this application may be implemented by hardware, or may be implemented by a processor by executing software instructions. The software instructions may include a corresponding software module. The software module may be stored in a random access memory (random access memory, RAM), a flash memory, a read-only memory (read-only memory, ROM), an erasable programmable read-only memory (erasable programmable ROM, EPROM), an electrically erasable programmable read-only memory (electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an application-specific integrated circuit (application-specific integrated circuit, ASIC).

From the descriptions of the foregoing implementations, a person skilled in the art may understand clearly that, for convenience and brevity of description, division into the foregoing function modules is merely used as an example for description. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed methods may be implemented in other manners. The apparatus embodiment described above is merely an example. For example, division into modules or units is merely logical function division, and there may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the modules or units may be implemented in electronic, mechanical, or other forms.

In addition, function units in embodiments of this application may be integrated into one processing unit, each unit may exist alone physically, or two or more units may be integrated into one unit. The integrated unit may be implemented in a form of hardware, or may be implemented in a form of a software function unit.

The computer-readable storage medium includes but is not limited to any one of the following: any medium that can store program code, such as a USB flash drive, a removable hard disk, a read-only memory (read-only memory, ROM), a random access memory (random access memory, RAM), a magnetic disk, or an optical disc.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A display method to be applied to a first electronic device, the method comprising:

displaying first display content;

sending a first message for performing display configuration;

obtaining identification information of a second electronic device, wherein there are a plurality of second electronic devices, and each second electronic device corresponds to one piece of identification information;

determining a first correspondence between a display region of the first electronic device and the identification information, wherein there are a plurality of display regions, and display content corresponding to each display region of the first electronic device is a part or all of the first display content;

sending a second message; and sending the first display content, wherein the second message is used by the second electronic device to obtain a display region corresponding to the identification information from the second message based on the identification information, and wherein the display region is used by the second electronic device to display display content that is in the first display content and that corresponds to the display region.

2. The method according to claim 1, wherein at least one of the first message or the second message is sent in a broadcast manner or a multicast manner.

3. The method according to claim 1, wherein before the sending a second message, the method further comprises:

determining the second message based on the first correspondence, wherein in the second message, each piece of identification information and a display region that has the first correspondence with the identification information are corresponding field content.

4. The method according to claim 1, wherein the display region comprises pixel coordinates of the display content that is in the first display content and that corresponds to the display region.

5. The method according to claim 1, wherein the first message and/or the second message comprise/comprises a first identification digit, and the first identification digit indicates that a message type is a display configuration message.

6. The method according to claim 1, wherein the obtaining identification information of a second electronic device comprises:

collecting, by using an image collecting apparatus in the first electronic device, the identification information displayed on a display of the second electronic device, wherein the identification information is presented in one or more manners of a two-dimensional code, an image, and/or a character; or receiving a third message sent by the second electronic device in response to the first message, wherein the third message carries the identification information.

7. The method according to claim 1, wherein before the determining a first correspondence between a display region of the first electronic device and identification information, the method further comprises:

receiving an operation of determining the display region by a user, and determining the display region; or automatically determining, based on an amount of identification information, a same quantity of display regions as the amount of identification information.

8. The method according to claim 1, wherein before the determining a first correspondence between a display region of the first electronic device and identification information, the method further comprises:

displaying an identifier corresponding to the identification information, wherein the identifier comprises a serial number of a second electronic device corresponding to the identification information and/or an icon of the second electronic device corresponding to the identification information.

9. The method according to claim 8, wherein the determining a first correspondence between a display region of the first electronic device and identification information comprises:

receiving an operation of dragging the identifier by the user to the display region, and determining the first correspondence between the display region and the identification information corresponding to the identifier.

10. The method according to claim 1, wherein the first correspondence comprises one or more of the following correspondences:

one display region corresponds to one piece of identification information, one display region corresponds to a plurality of pieces of identification information, and a plurality of display regions correspond to one piece of identification information.

11. A display method to be applied to a second electronic device, the method comprising:

receiving a first message for performing display configuration;

sending identification information of the second electronic device to a first electronic device;

receiving a second message;

receiving first display content;

obtaining a display region corresponding to the identification information from the second message based on the identification information, wherein a first correspondence exists between the identification information and the display region, and the first correspondence is determined by the first electronic device; and displaying display content that is in the first display content and that corresponds to the display region.

12. The method according to claim 11, wherein before the receiving a first message, the method further comprises:

enabling a message listening mode, wherein the message listening mode is used to listen to a broadcast message or a multicast message.

13. The method according to claim 11, wherein at least one of the first message or the second message is received in a broadcast manner or a multicast manner.

14. The method according to claim 11, wherein the obtaining a display region corresponding to the identification information from the second message based on the identification information comprises:

determining, in the second message, an identification information field that matches the identification information; and obtaining the display region from a field that is in the second message and that corresponds to the identification information field.

15. The method according to claim 11, wherein the display region comprises pixel coordinates of the display content that is in the first display content and that corresponds to the display region.

16. The method according to claim 15, wherein the displaying display content that is in the first display content and that corresponds to the display region comprises:

determining to-be-displayed content in the first display content based on the pixel coordinates; and displaying the to-be-displayed content.

17. The method according to claim 11, wherein the first message and/or the second message comprise/comprises a first identification digit indicating that a message type is a display configuration message.

18. The method according to claim 11, wherein the sending identification information of the second electronic device to a first electronic device comprises:

displaying the identification information of the second electronic device on a display; or sending a third message to the first electronic device, wherein the third message carries the identification information.

19. A first electronic device, comprising:

a processor; and a memory is coupled to the processor and having stored thereon computer-executable program code that, when executed by the processor, causes the processor to:

display first display content;

send a first message for performing display configuration;

obtain identification information of a second electronic device, wherein there are a plurality of second electronic devices, and each second electronic device corresponds to one piece of identification information;

determine a first correspondence between a display region of the first electronic device and the identification information, wherein there are a plurality of display regions, and display content corresponding to each display region of the first electronic device is a part or all of the first display content;

send a second message; and send the first display content, wherein the second message is used by the second electronic device to obtain a display region corresponding to the identification information from the second message based on the identification information, and wherein the display region is used by the second electronic device to display display content that is in the first display content and that corresponds to the display region.

20. A second electronic device, comprising:

a processor; and a memory coupled to the processor and having stored thereon program code comprising processor-executable instructions that, when executed by the processor, causes the processor to:

receive a first message for performing display configuration;

send identification information of the second electronic device to a first electronic device;

receive a second message;

receive first display content;

obtain a display region corresponding to the identification information from the second message based on the identification information, wherein a first correspondence exists between the identification information and the display region, and the first correspondence is determined by the first electronic device; and display content that is in the first display content and that corresponds to the display region.

* * * * *